United States Patent
Friedman

(10) Patent No.: US 7,540,015 B2
(45) Date of Patent: May 26, 2009

(54) SYSTEM, METHOD AND APPARATUS FOR ESTABLISHING PRIVACY IN INTERNET TRANSACTIONS AND COMMUNICATIONS

(75) Inventor: Solomon Friedman, Brooklyn, NY (US)

(73) Assignee: Privacy Shield LLC, Brooklyn, NY (US)

( * ) Notice: Subject to any disclaimer, the term of this patent is extended or adjusted under 35 U.S.C. 154(b) by 1514 days.

(21) Appl. No.: 09/854,307

(22) Filed: May 11, 2001

(65) Prior Publication Data

US 2002/0188863 A1 Dec. 12, 2002

(51) Int. Cl.
*G06F 17/30* (2006.01)
*H04M 3/16* (2006.01)

(52) U.S. Cl. .............. 726/2; 726/3; 726/4; 726/15; 726/9; 726/20; 713/160; 713/166; 713/182; 713/186; 713/193; 713/194; 709/223; 709/224; 709/225; 709/226

(58) Field of Classification Search ......... 713/200–202; 709/223–229; 726/15, 9, 20
See application file for complete search history.

(56) References Cited

U.S. PATENT DOCUMENTS

| | | | |
|---|---|---|---|
| 5,007,084 A | 4/1991 | Materna et al. | 380/24 |
| 5,406,619 A | 4/1995 | Akhteruzzaman | 340/95 |
| 5,485,510 A | 1/1996 | Colbert | 379/45 |
| 5,530,438 A | 6/1996 | Bickham et al. | 240/825 |
| 5,615,110 A | 3/1997 | Wong | 395/238 |
| 5,636,282 A | 6/1997 | Holmquist et al. | 380/25 |
| 5,671,279 A | 9/1997 | Elgamal | 380/23 |
| 5,727,163 A | 3/1998 | Bezos | 395/227 |
| 5,757,917 A | 5/1998 | Rose et al. | 380/25 |
| 5,778,173 A | 7/1998 | Apte | 395/187.01 |
| 5,815,665 A * | 9/1998 | Teper et al. | 709/229 |
| 5,822,737 A | 10/1998 | Ogram | 705/26 |

(Continued)

FOREIGN PATENT DOCUMENTS

JP 2001-306611 11/2001

(Continued)

OTHER PUBLICATIONS

Japanese Office Action in JP 2002-589987, dated Aug. 8, 2006, with English translation.

*Primary Examiner*—Kristine Kincaid
*Assistant Examiner*—Jenise E. Jackson
(74) *Attorney, Agent, or Firm*—Abelman, Frayne & Schwab

(57) ABSTRACT

A system for conducting a transaction with privacy on a wide area network, the system including a personal access device (PAD) associated with a subscriber to the system, the PAD storing a profile of the subscriber and generating commands, a privacy service provider (PSP) connected to the wide area network, the PAD being accessible by the PSP under first conditions set by the profile and the PSP being responsive to the commands from the PAD, a registered vendor (RV) connected to the wide area network, and a privacy shield network (PSN) connected to the wide area network, the RV being registered with the PSN and the PSN being structured to carry communications between the PSP and the RV related to the transaction under second conditions set by the profile. Advantageously, the PAD stores private data associated with the subscriber, and the PSP releases any of the private data to the RV only under the first and second conditions.

42 Claims, 16 Drawing Sheets

U.S. PATENT DOCUMENTS

| | | | |
|---|---|---|---|
| 6,012,098 A | 1/2000 | Bayeh et al. | 709/246 |
| 6,029,150 A * | 2/2000 | Kravitz | 705/39 |
| 6,069,588 A | 5/2000 | O'Neill, Jr. | 343/713 |
| 6,098,056 A | 8/2000 | Rusnak et al. | 705/75 |
| 6,185,683 B1 | 2/2001 | Giner et al. | 713/176 |
| 6,195,542 B1 | 2/2001 | Griffith | 455/406 |
| 6,275,824 B1 * | 8/2001 | O'Flaherty et al. | 707/9 |
| 6,510,983 B2 * | 1/2003 | Horowitz et al. | 235/380 |
| 6,643,684 B1 * | 11/2003 | Malkin et al. | 709/206 |
| 6,798,358 B2 * | 9/2004 | Joyce et al. | 340/995.24 |
| 2002/0123359 A1 * | 9/2002 | Wei et al. | 455/466 |
| 2002/0184500 A1 * | 12/2002 | Maritzen et al. | 713/170 |
| 2005/0127167 A1 | 6/2005 | Nakajima | |

FOREIGN PATENT DOCUMENTS

| | | |
|---|---|---|
| WO | WO 01/09806 A1 | 8/2001 |

\* cited by examiner

SYSTEM, METHOD AND APPARATUS FOR ESTABLISHING PRIVACY IN INTERNET TRANSACTIONS AND COMMUNICATIONS

FIELD OF THE INVENTION

The invention relates to the electronic transmission of data from an individually controlled electronic device over a network that is accessible to others.

BACKGROUND OF THE INVENTION

With the advent of computer technology, especially the Internet global computer network, the transmission of personal private and secured information has become very critical. For example, credit card transactions necessarily must be secure transmissions or the critical data on the credit card can be taken and used in unauthorized transactions.

In a similar vein, people have concerns about their personal information, such as their Social Security number, medical history, financial status, employment, personal history etc. Frequently, this is the type of information that people do not want to have freely circulated and they want it to remain confidential.

It is not uncommon with modem computers for the user to set up some type of privacy profile. Without the necessary password, access to the computer and its use is effectively blocked. Only the person with the correct password can use it. A potential security breach can be created, however, if the computer has a modem and a computer hacker accesses the computer remotely and enters into the memory of the computer through the modem. In this manner, the privacy information might be improperly copied and used in an unauthorized manner.

As a result, there is an ever-increasing creation of software and hardware that makes it more and more difficult to access a computer without authorization and to obtain secured files. Bezos (U.S. Pat. No. 5,727,163), Rose (U.S. Pat. No. 5,757,917) and Apte (U.S. Pat. No. 5,778,173) disclose various Internet transaction protocols to provide security for the buyer's credit card information. These patents do not, however, disclose any specific method whereby the proprietor of the confidential information himself can control and regulate the outflow of this information. Rather, each of these systems requires some process apart from the Internet in order to maintain the integrity of the secured information on the Internet. This defeats the entire goal of a fast and efficient transaction on the Internet.

Other approaches include Materna (U.S. Pat. No. 5,007,084), Bickham (U.S. Pat. No. 5,530,438) and Wong (U.S. Pat. No. 5,615,110), which disclose various means for secure transactions which do not involve the use of the Internet. A universal authenticator for use with an ordinary telephone station over an ordinary telephone line is disclosed by Akhteruzzaman (U.S. Pat. No. 5,406,619) which does not involve transmitting any information over the Internet. Colbert (U.S. Pat. No. 5,485,510) discloses a method for making a credit card purchase without revealing the account information to the vendor. A method for dial-in access security using a multimedia modem is disclosed by Holmquist (U.S. Pat. No. 5,636,282). Ogram (U.S. Pat. No. 5,822,737) discloses an automated payment system for use over the Internet. Wolf (U.S. Pat. No. 5,875,232) discloses a personalized voice mail identification system.

The courier electronic payment system provides customers, merchants and banks with a secure mechanism for using a public network as a platform for credit card payment services. This was developed by Elgamal (U.S. Pat. No. 5,671,279). This system uses a secure connection with an electronic payment protocol that secures credit card payments and certifies infrastructure that is required to enable all the parties to participate. This system suffers the inherent Internet problem that the secured information is in some manner stored, albeit temporarily, in one computer. If the information is so stored, even for only a minimal amount of time, it lends itself to the possibility of being misappropriated.

Online sales are now in the billions of dollars as many computer users have embraced the digital marketplace. In the first quarter of the year 2000, retail electronic commerce sales were over five billion dollars. Some predict that online shopping could grow to seventy-eight billion dollars per year by the year 2003. With more than one-third of all households in the United States connected online to the Internet, consumers increasingly are using the Internet to conduct any number of daily activities. Many of these include confidential information, such as credit card information, bank information, personal financial information, personal history, etc. A June 2000 FOX News opinion poll revealed that 69% of respondents said that they are very concerned about their ability to keep things such as medical or financial records private, and 90% said that it is getting harder to keep such information confidential.

In 2000, the United States Senate Judiciary Committee Chairman, Senator Orrin G. Hatch, issued a report entitled "Know the Rules Use the Tools, Privacy in the Digital Age: A Resource for Internet Users." In this report, there is an express recognition of the "growing concerns about the vulnerability of their private information on the Internet." The Senate Judiciary Committee found that "many people are worried about sharing their credit card and other personal information over the Internet" and that "certain conduct is taking place online that could threaten to chill the continued rapid expansion of the digital marketplace: the extensive collection by websites of personally identifiable information about consumers, often without consumers' consent or knowledge." Indeed, the Senate report found that various surveys show that "consumers are so fearful of losing their privacy that they are avoiding engaging in e-commerce altogether." It seems that the casual accumulation of private, personal data by businesses and governments in the course of their dealings with individuals is truly worrisome to many people.

According to the Senate report, Novell has an Identity Management Service known as DigitalMe that enables Internet users to store their confidential information on "mecards." While this keeps the information in a more secure location and out of the computer, its use is somewhat limited. In particular, such cards can be used only with computers that are configured with reading devices that are compatible with these cards. This system works only when the majority of all computers are provided with the necessary card readers. Another inherent difficulty with this system is that the information on the cards cannot be easily changed and updated and/or supplemented. Moreover, this system does not give the choice to the user to perform the transaction without disclosing all his personal data.

In a different approach, one of the first products to take advantage of the new Bluetooth wireless technology is a system developed by the Finnish company Sonera SmartTrust Oy that is described in International patent publication No. WO 00/56105. The user has a portable device in which his identification code is stored, along with other pertinent information. Upon reaching a service provider, such as a gas station, the portable device comes within range of a compatible device at the service provider. By means of Bluetooth technology, the two devices can communicate and data from the user's device is provided to complete the transaction.

The problem with this method is that the device is always "on." By this it is meant that the device is essentially always transmitting data. Therefore, any time the user comes within range of a receiving device maintained by a service provider, communication will be established and there will be a transmission of vital data about the user. Also, the user is not free to add and use private data. Thus, unwarranted transactions could occur as well as the undesired transmission of confidential information.

The Sonera device is somewhat like the EZ Pass® transmitter used in New York state and elsewhere. The device is always transmitting a signal, whether the user desires to do so or not. Each time the user uses it to go through a toll plaza, the user's account with the authority is charged the amount of the toll. If the driver pays the toll by some other means, because the EZ Pass device is always transmitting the driver will then be charged twice—once via the EZ Pass and once through the other means that was used. There is no way to disable the EZ Pass. The best that can be done is to place the EZ Pass in some type of shielding device that effectively blocks the continuous transmission of the signal, as disclosed in U.S. Pat. No. 6,127,938 to the present applicant.

The same disadvantage occurs with the Sonera device. Someone who has this device and enters a gas station (or other service provider) with the complementary unit will necessarily have communication established and a transaction will be concluded. There is no way for the user to control his device so as to limit or restrict the outflow of data and to prevent unwarranted communications.

Finally, in the interest of providing security, there are systems that provide what is called a "trusted go-between." Rather than communicating directly with each other, two users of the system communicate with a third party which is trusted to have the necessary security protocols in place and not to use or reveal the information it receives from the users. Nevertheless, these systems still require that the confidential information of both parties be present in the trusted go-between while the transaction is taking place, and data must be transferred to all the parties involved. Therefore these systems are susceptible to misuse and cannot provide true user anonymity.

Accordingly, while there exist systems providing some security for Internet transactions, there is no system available which provides the desirable degree of privacy and anonymity for users.

SUMMARY OF THE INVENTION

It is therefore, an object of this invention to provide an interactive system functioning in conjunction with the Internet in which a subscriber is provided with a communications device capable of storing and/or accessing personal information in digital form that can be transmitted only when authorized by the subscriber.

It is a further object of this invention to provide a system in which the subscriber receives a signal from a privacy service provider that informs the subscriber of a third-party's request for the transmission of personal data and/or that requests the subscriber's approval to transmit data from or through the service provider.

The above and other objects and advantages are achieved by the present invention which, in one embodiment, is directed to a system for conducting a transaction with privacy on a wide area network. The system includes a personal access device (PAD) associated with a subscriber to the system, the PAD storing a profile of the subscriber and generating commands, a privacy service provider (PSP) connected to the wide area network, the PAD being accessible by the PSP under first conditions set by the profile and the PSP being responsive to the commands from the PAD, a registered vendor (RV) connected to the wide area network, and a privacy shield network (PSN) connected to the wide area network, the RV being registered with the PSN and the PSN being structured to carry communications between the PSP and the RV related to the transaction under second conditions set by the profile.

In accordance with a further aspect, the PAD stores private data associated with the subscriber, and the PSP releases any of the private data to the RV only under the first and second conditions.

In accordance with another aspect, a privacy service provider (PSP) for facilitating communications between a privacy shield network (PSN) and a personal access device (PAD) associated with a subscriber to the PSN, where the PAD stores a profile of the subscriber and where the PSP and the PSN are connected to a wide area network. This PSP includes a receiver for receiving commands from the PAD, a server for communicating with a registered vendor (RV) over the PSN under first conditions set by the profile and in accordance with commands received from the PAD, the server also for receiving first requests from the RV and for determining which ones of the first requests are authorized requests under second conditions set by the profile, and a transmitter for transmitting the authorized requests to the PAD.

Advantageously, the PAD is in the form of a selected one of a key chain fob, a pen, a cellular phone, a personal digital assistant, a computer and a card.

These and other objects, features and advantages of the present invention will become apparent from the following detailed description of the preferred embodiments taken in conjunction with the appended drawings, wherein like numerals indicate like elements.

DETAILED DESCRIPTION OF THE PREFERRED EMBODIMENTS

Figure 1:
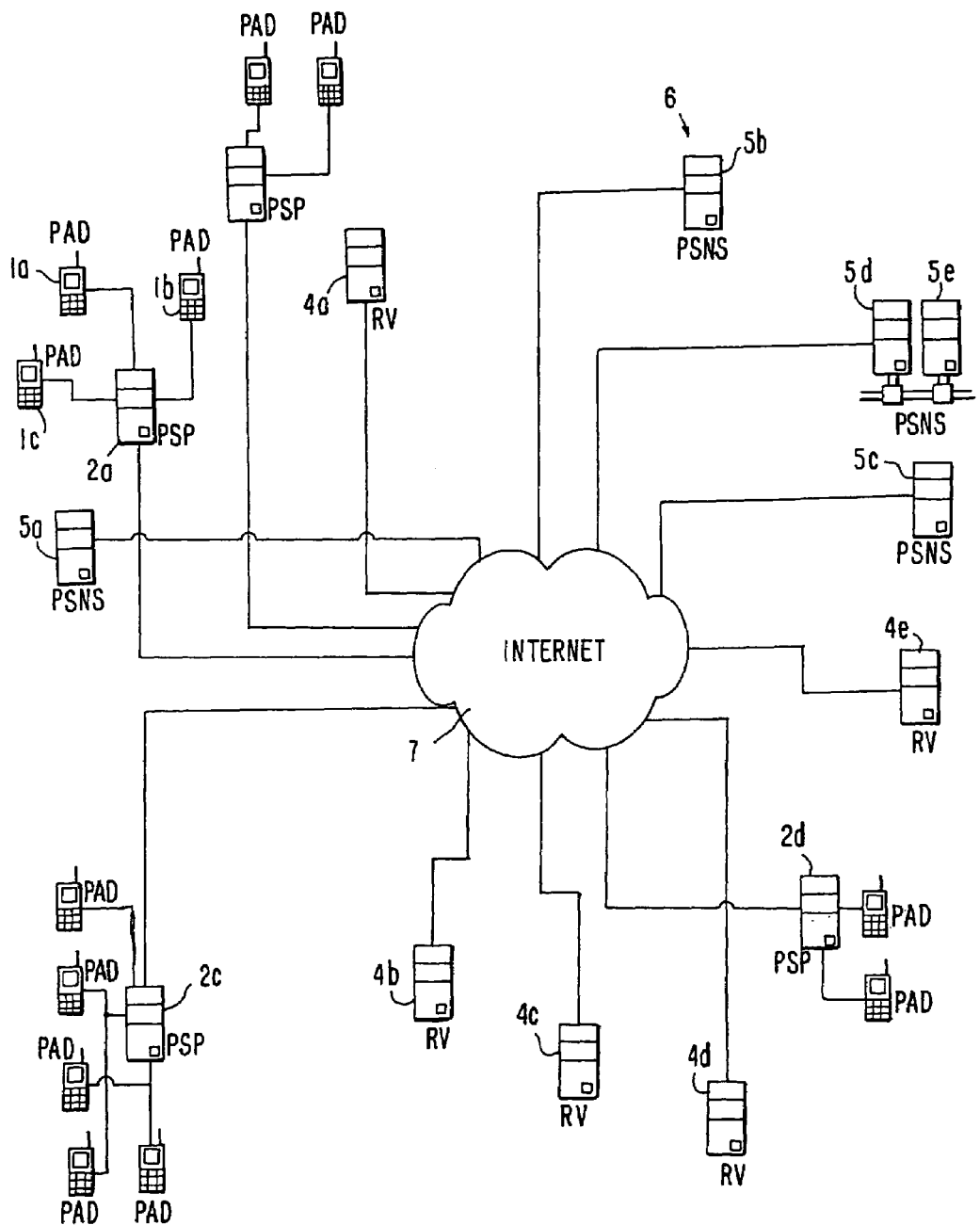
FIG. 1 is a conceptual bird's-eye view of an embodiment of the present invention.

Certain terms in this application are referred to using acronyms or abbreviations, and reference may be made to the Glossary given below.

As used herein, the term "transaction" means not only an interaction in which something of value is exchanged, but also any and all types of communications and interactions between entities that are possible over a network, including all types of communications.

In its broadest aspect, the present invention is directed to providing privacy, i.e. any desired level of anonymity, to individuals using the Internet or other wide area network by ensuring that no entity other than the individual has access to all the information characterizing his transactions, whether those are on the Internet, in a retail setting or any other setting having the appropriate infrastructure. This information would include both private information identifying the individual, i.e. a data file including, for example, the individual's name, Social Security number, credit card numbers, particular likes or dislikes and much other data, as well as information describing the transaction, e.g. the item and price in a purchasing transaction.

As used herein, the terms "privacy" and "private" as applied to the individual's communications are different from the commonly accepted usage of the terms "security" and "secure." Security refers to the prevention of unauthorized access to information that is being stored or transmitted. Thus, security protects a "thing," i.e. the particular piece of information being stored in a particular element or being transmitted along a particular path. Accordingly, something is made secure by shielding it in some way, such as by encryption, and such shielding may be attacked. "Privacy," on the other hand, refers to the holding back of certain information so that the participant in a transaction cannot be identified. Privacy protects a "fact," i.e. the participant's identity or characteristics, regardless of where that fact is used. If the fact is not put out to be appropriated, it cannot be misappropriated.

The present invention achieves its privacy objectives by avoiding the use of a single "trusted go-between" to be trusted by both parties to a transaction, because this prior art method inherently requires that a party's private information, for example a credit card number, be available to the other party to the transaction. Rather, the party uses an intermediary on the Internet, termed here a privacy shield network, that transfers the private information not to the other party, but instead to mediating parties, called RVs, that are responsible only to him and to no other party. The two parties can therefore negotiate a transaction over a network without releasing private information to each other.

In one aspect, therefore, the present invention is directed to a network that allows a subscriber to communicate, and to initiate and conclude transactions, over the Internet anonymously. In contrast, current Internet communications and transactions are not anonymous. In addition, web surfing can be traced back to the originator via a so-called cookie or via IP addresses, e.g., by storing the subscriber's address and maintaining a file containing data of websites visited, subject matter viewed, transactions transacted, purchases made and communications established. When the systems, methods and apparatus of the present invention are utilized, however, no such external tracing and/or recording of information concerning communications and transactions is possible or necessary. On the other hand, the subscriber has the option of tracing his own activity, collecting a profile that will store and organize websites visited, subject matter viewed, and the like for later review and retrieval, or publication on the privacy service provider's privacy server to become part of the subscriber's profile. The subscriber is therefore able to control his own so-called cookie. Thus, the systems, methods and apparatus of the invention allow the same degree of anonymity for Internet transactions as might apply to an ordinary retail cash purchase made by an unknown buyer through a clerk at a retail store.

One embodiment of the present invention comprehends a system for establishing private communications via the Internet. The system includes a Privacy Shield Network (PSN) and one or more Privacy Service Providers (PSP), each PSP issuing individualized Personal Access Devices (PAD) to subscribers to the PSN that enable the subscribers to communicate with and over the system. The system further comprehends one or more Registered Vendors (RV) each of which has a unique identifying indicium or code for establishing communications with the PSPs through the PSN. Overall, each subscriber uses the PSP associated with his PAD as a trusted intermediary, responsible to him and only him. This PSP holds, or can access, enough of the subscriber's private data stored on the PAD to enable the PSP to negotiate a transaction with an RV or another subscriber over the PSN, but this PSP does not release any of this private information to the other party's PSP or RV unless specifically authorized by the subscriber. Accordingly, the other party cannot access or retain the subscriber's private information without the subscriber's express permission.

As used herein, the subscriber's personal data records (SPDR) consist of private data that describe the subscriber's identity, and which in consequence the subscriber may wish to keep private to a designated extent. On the other hand, the subscriber's personal profile (SPP) consists of information that sets conditions for transactions on the PSN, including but not limited to the use and the release of some or all of the SPDR.

FIG. 1 is a conceptual view of this embodiment of the invention. As shown therein, a PAD 1a is associated with a PSP 2a for conducting transactions over the Internet 7. PSP 2a, which is advantageously a network server with supporting structure, may have associated with it a number of other PADs 1b, 1c etc., and other PSPs 2b, 2c with their associated PADs may also form part of the system.

Each PSP 2 can be an existing Internet service provider (e.g. AOL, MSN, or an internal facility established by a business entity or other institution) or a new entity established for the purpose of providing private data transmission services to thereby avoid any credibility issues that may have been raised around the activities of existing providers. In one aspect, the PSP functions as a "gatekeeper," by enforcing the subscriber's profile and using specified PSN rules (PSNR), and controls the transmission of data/communications among the subscribers and other entities on the system. In particular, at least the PAD 1 and possibly also the PSP 2 store the subscriber's profile and/or private data to maintain its privacy.

Communication among the PSPs 2 is provided by the PSN 6. This is a network of servers, such as servers 5a, 5b, 5c, and supporting structure that maintains informational databases and provides functions such as routing, directory services and RV registration. These functions are conventional in themselves. However, it should be noted that the subscriber's private data is not output on the PSN 6 from the subscriber's PSP except to the extent authorized by the subscriber. If he wishes to keep all this information private, he can, and yet the system enables him to perform his desired transactions and communications.

The system further comprehends a plurality of Registered Vendors (RV) 4a, 4b, 4c etc. In general, the RVs 4 are the entities that provide services and/or goods that the subscribers may wish or need to access online, offline or retail online. In addition, an RV could be an RV that provides supporting functions to the subscribers as enhancements to the PSN, e.g. additional privacy functions. Each RV 4 is provided with a unique encrypted identification indicium or code (PVID) which is embedded in a ROM chip attached to its privacy server (PS) and which enables it, in combination with the corresponding IDs of the other participants, to transmit and/or receive data from the PSPs 2 and, under defined circumstances, through them to one or more subscribers. In order to be permitted access to the PSN 6, each RV 4 agrees, by formal contract or otherwise, to adhere to the specified PSNR in connection with transmitting and receiving data and entering into transactions with subscribers and/or other RVs 4 via the PSN 6. This is the process of registering a vendor as a registered vendor, and is administered by the PSN 6. In addition to providing its own conventional means for linking to the Internet 7, the RV 4 can also provide a specialized device, such as one employing the conventional Bluetooth, HomeRF, 802.11a or 802.11b or any other conventional, widely used wireless technology, for establishing communications with a subscriber's PAD 2 that is brought into communications proximity with the RV's device. Operating under their own sets of rules, RVs 4 such as retail businesses, institutions, governmental agencies and other entities can also communicate with each other over the system.

Figure 2A:
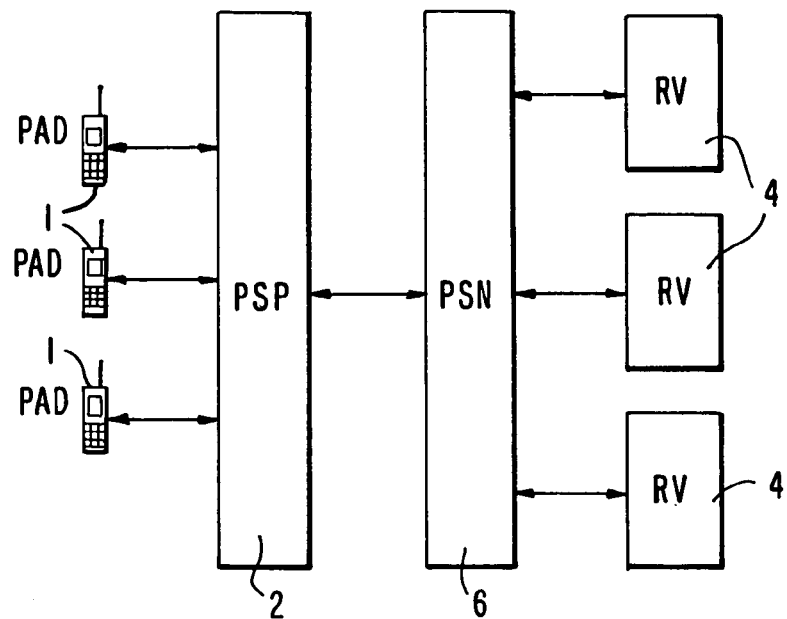
FIGS. 2A and 2B are conceptual views showing functional layers in the embodiment of FIG. 1.
Figure 2B:
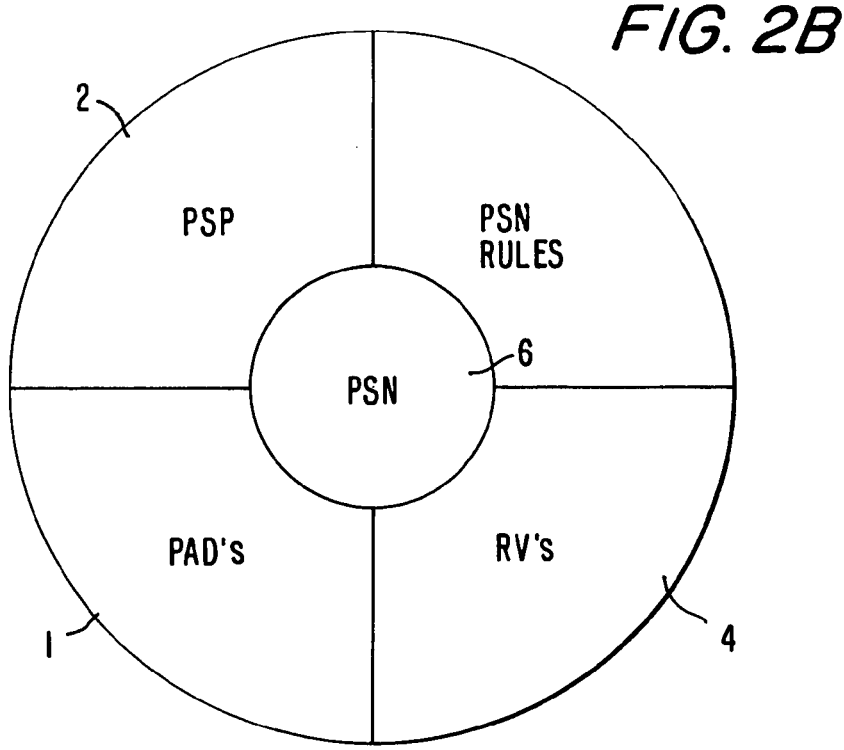

FIGS. 2A and 2B are conceptual views of the invention, here showing the layers in which the PSN, PSPs and PADs operate. In particular, FIG. 2B illustrates that the PSN is central in the operation of the system and controls the communications among the other elements.

Figure 3:
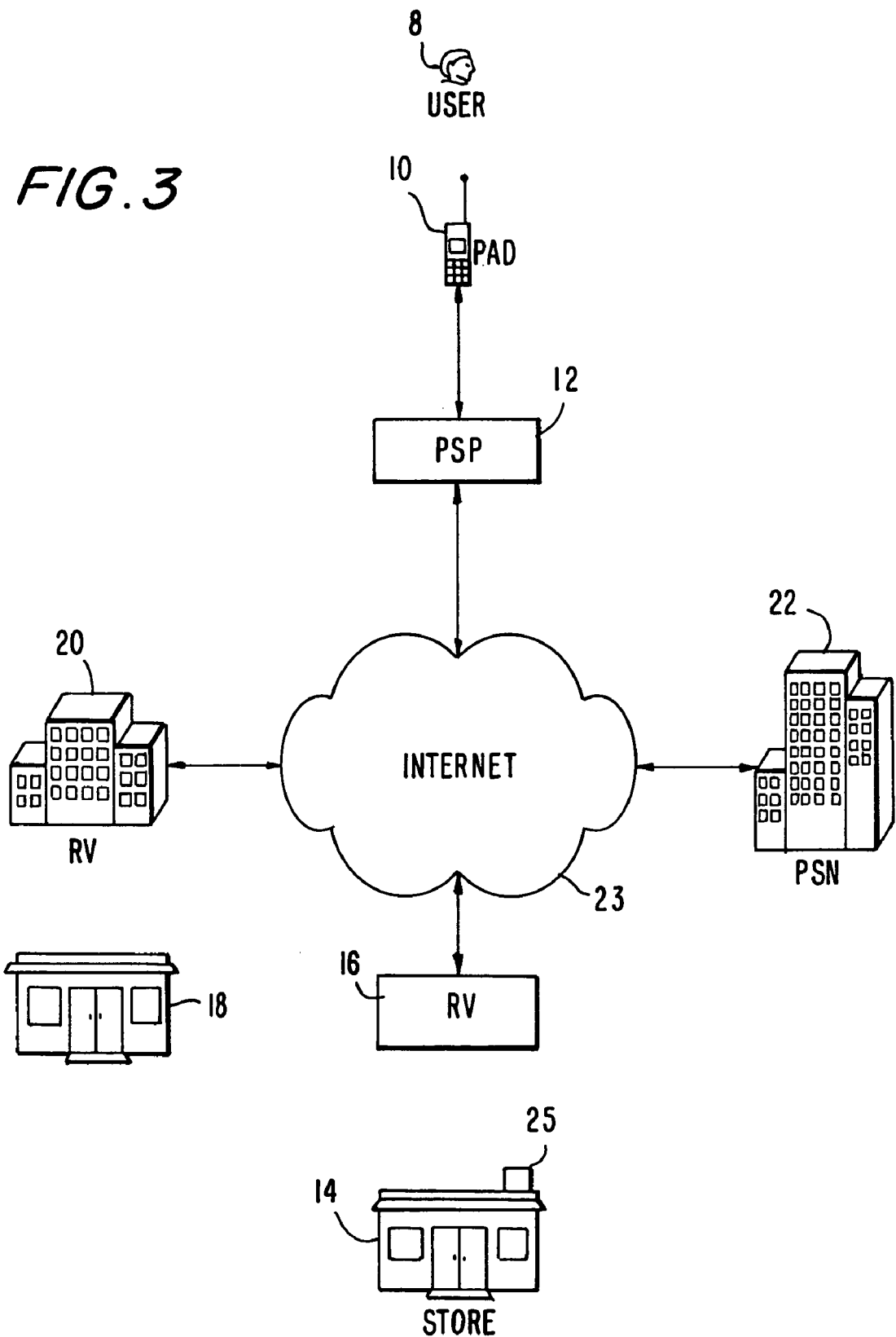
FIG. 3 is a view of the configuration of an embodiment of the present invention for a sales transaction.

Before describing the structural and operational aspects of the system in accordance with the present invention, it is believed that examples of specific types of transactions will clarify certain fundamental operations. FIG. 3 is a conceptual view of the configuration of a system in accordance with the present invention in an example of the subscriber's purchase of an item at a retail store using a credit card. It will be understood, of course, that the illustration of this and other configurations does not imply that the other entities on the system do not exist or cannot be supplemented, but rather that they are not expressly used in the described transaction, although a number of support operations possibly using these entities may be taking place. Moreover, although it will not always be stated, all communications among PSPs and RVs are controlled by the PSN, and are made in accordance with conditions set by the users' profiles and the PSN privacy rules.

In the present transaction, as shown in FIG. 3, the parties are the subscriber 8 using his PAD 10 and the associated PSP 12, the store 14, operating through its privacy server RV 16 and the financial institution 18 that issued the subscriber's credit card. This financial institution is on the system through its own privacy server as an RV 20. Also part of the transaction, although not as parties, are the PSN 22 and the Internet 23. The fundamental operations of this transaction are as follows.

As a registered vendor on the system, the store RV 16 includes a wireless communications device (e.g. the specialized device) with one or more transceivers 25 that continually broadcast inquiries to determine whether a PAD has entered within range, e.g. into the store 14. When the subscriber 8 carrying his PAD 10 enters the store 14, this begins the first phase of a three phase transaction/communication. The first phase is a preparation phase, under the control of the subscriber 8. To begin, the PAD 10 receives an inquiry. In accordance with the subscriber's profile, the PAD 10 can ignore the inquiry or can send a communication to its PSP 12 using the wireless technology in the store 14 or other means. It is assumed in this example that the PSP 12, in addition to the PAD 10, stores the profile of the subscriber 8, and this is a preferred method to avoid unnecessary communications between the PSP 12 and the PAD 10. The PSP 12, by reference to the profile, determines whether the store 14 is one that the subscriber 8 wishes to deal with and, if so, the PSP 12 exchanges preliminary information with the store RV 16 over the PSN 22 to prepare for a purchase. For example, if the store 14 is on a preferred RV list, the preliminary information can be exchanged, while if this is a new store, the PSP 12 can ask the PAD 10 or the profile whether the store should be added to the list. It will be noted that this preliminary information does not include any of the information in the profile, but rather is on the order of protocol information. For example, the PAD 10 might be assigned a customer number, e.g. #70, like a bakery number, to be used for identification in any transaction with the store 14.

The PSP 12 itself initially lists all RVs necessary for completing the transaction. In this phase, the initial list is based upon publicly available information on the PSN 22. For example, the store 14 will publish which credit cards it will accept, and the preparation PSP 12 matches one of the subscriber's credit cards, taken from his profile and/or private data, to one of the store's credit cards. The initial list thus matches up RVs selected both the subscriber 8 and the store 14.

After all the necessary RVs have been matched up to make a proposed list and the subscriber 8 has identified the item for purchase, he takes it to the store's register, which is in communication with the store RV 16. The register scans the item for its price (e.g. $100), identifies the sale by customer #70 and sends a communication through the PSN 22 to the PSP 12 requesting authorization to complete the sale. Depending on the profile, the PSP 12 can generate the authorization automatically or it can query the PAD 10, requesting authorization in the form of a command generated by the subscriber's actuation of a control, for example pushing a "PROCEED" button. If there is no authorization, there is no sale and the subscriber 8 can leave the store 14 having left no record of his visit that can be tied to him.

The same freedom from a record trail will be provided by the present invention in other communication scenarios.

If there is authorization, the second phase of the transaction begins. This is a setup phase in which a final list of RVs is approved with authorizations and all necessary responses from all participants. For example, while the initial list may have selected VISA as a credit card, the VISA RV may decline to authorize payment. If so, the PSP 12 selects another credit card acceptable to both the subscriber 8 and the store 14 and tries again for authorization from the RVs.

The request for approval of the credit card takes place as follows. The PSP 12 sends a communication not to the store RV 16, but rather to the RV 20 of the financial institution 18 saying in effect, "Please issue a credit of $100 to RV 16 from my account for a transaction using customer #70." If it is confirmed that the subscriber's account is in order for this request, the RV 20 sends a communication to the RV 16 saying in effect, "I am giving you credit of $100 to complete the transaction for customer #70." A similar query and evaluation is performed for each of the RVs on the list.

If a list of RVs is fully approved, their responses are gathered with a ready flag, and held in a standby state for a predetermined time, waiting for the go ahead signal from the subscriber should all parties agree to their respective service/goods and payment/receipt obligations. The predetermined time, which is settable by the subscriber's profile, may be, for example, 15 minutes, during which time the appropriate RVs and PSPs are queried and respond to set up all the details of the transaction, waiting for the subscriber 8 to give the final ok. In this way, the subscriber 8 need not commit himself to the transaction until all the details have been set up for his review.

The PSN 22 collects and submits all confirmation responses from the PSP 12, RV 16 and RV 20 and holds them during the predetermined time, sending a message to PSP 12 when the transaction is ready for the go ahead should the subscriber accept it. The PSP 12 sends this message on to PAD 10.

Now the subscriber 8 can either send a command accepting the transaction, send a command canceling the transaction or simply not respond. If the cancel command is sent or the predetermined time expires without a response, the PSN 22 cancels the transaction and the store RV 16 and financial institution RV 20 nullify their preparations. On the other hand, if the subscriber 8 sends the accept command, the transaction enters its final phase, in which the PSN 22 completes the authorizations and credit transfers. The sale is then complete, the subscriber 8 has paid for and received his item and the store 14 has its money.

Should any of the participants not accept the final command, a conventional rollback will occur.

It should be noted that during this process, neither the store 14 nor its RV 16 ever has access to the subscriber's profile or any information about him, including his credit card number. All the store 14 knows, and all it should really care about, is that it has been paid.

Figure 4:
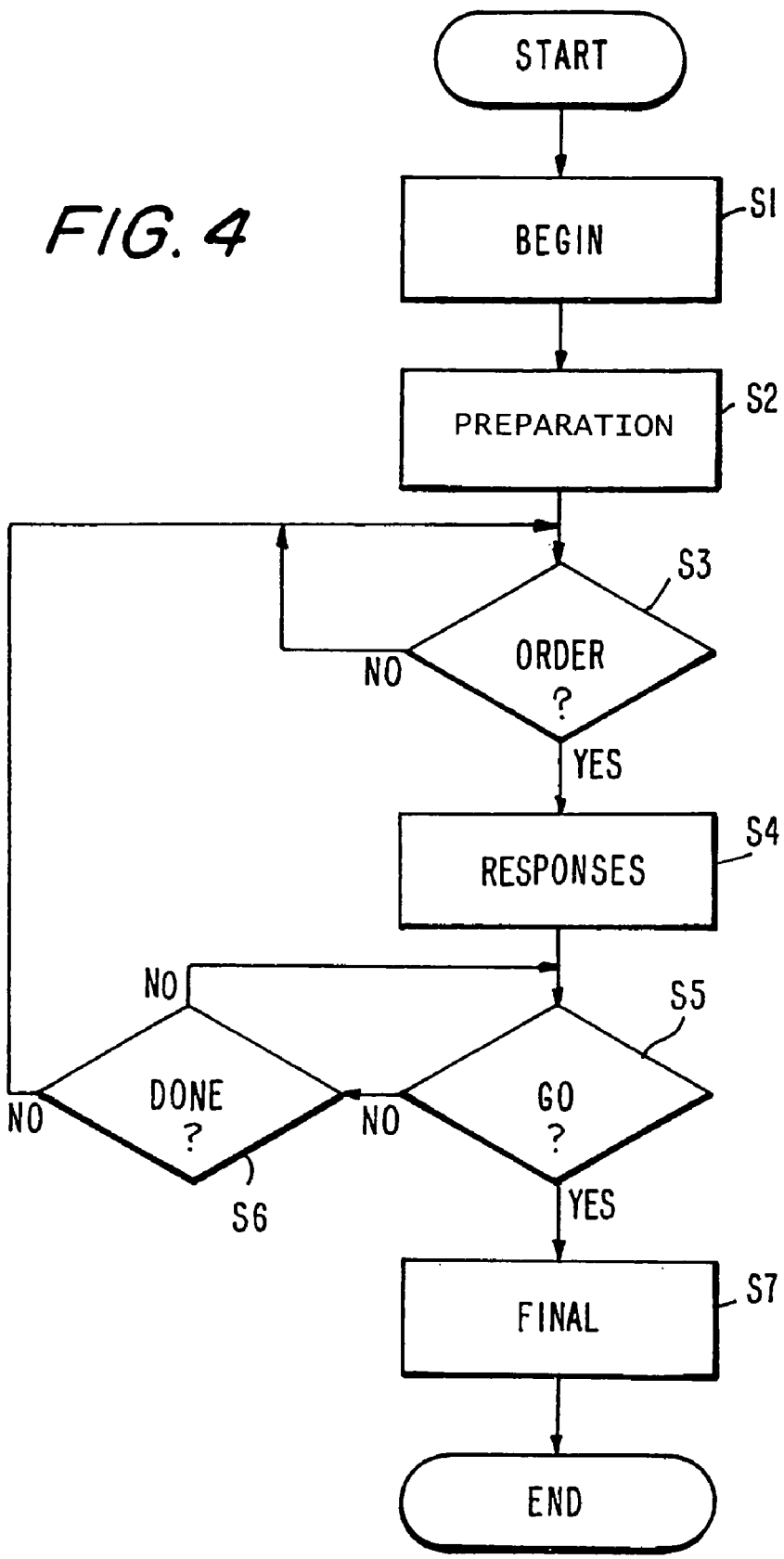
FIG. 4 is a flowchart of a transaction for the transfer of something of value.
Figure 5:
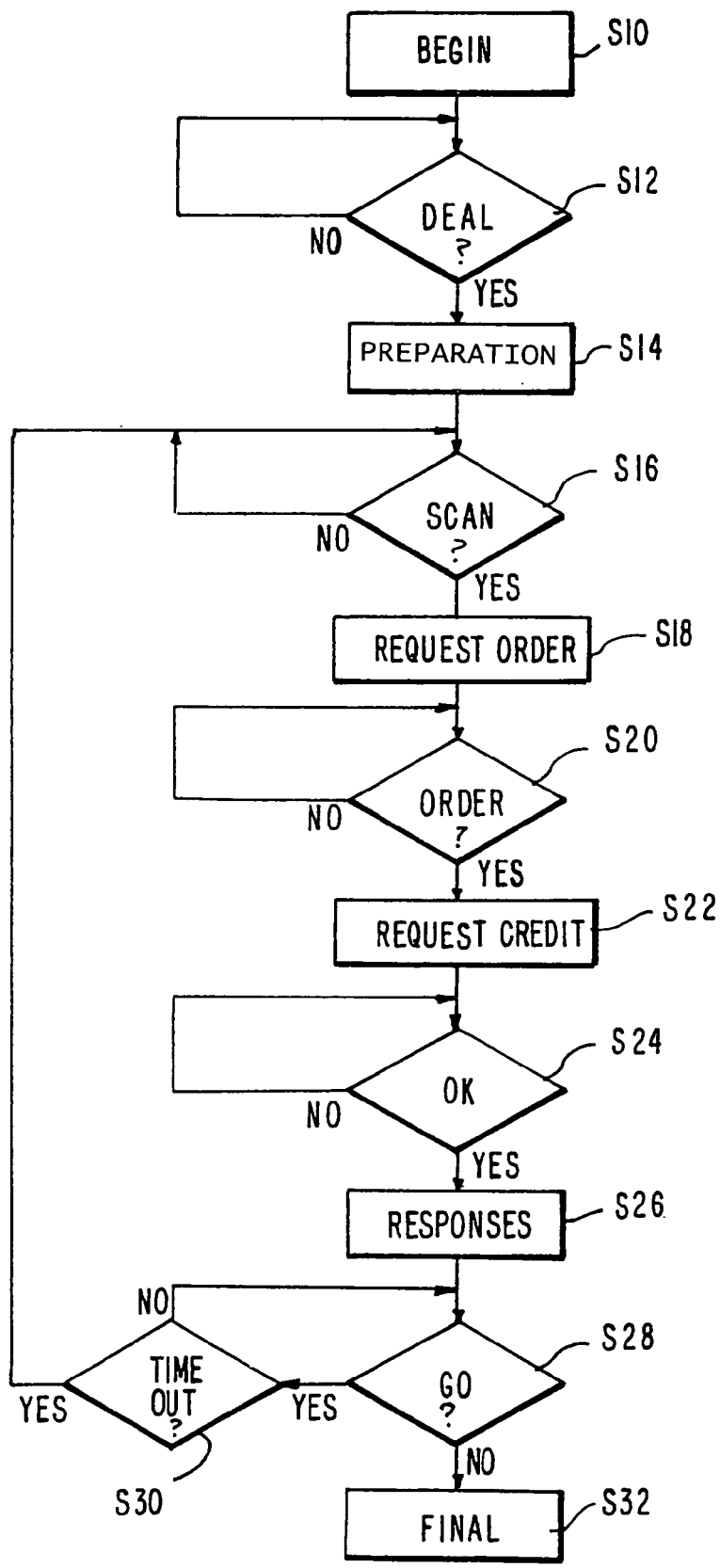
FIG. 5 is a flowchart of the transaction of FIG. 3.

This operation is shown in FIGS. 4 and 5, which are flowcharts of this transaction. FIG. 4 illustrates the three phases of the transaction. It is noted that all transactions involving the transfer of goods or services or anything of value can be performed in accordance with the steps of FIG. 4. Thus, in step S1, communication between the PAD 10 and the RV 16 begins (e.g. the subscriber 8 has entered the store 14). Step S2 is the preparation phase, and in step S3 the PSN 22 waits for a command from the subscriber 8 to place an order. If the command is received, the process goes to the setup phase including steps S4, S5 and S6, where in step S4 the responses are gathered, in step S5 a go ahead signal from the subscriber 8 is awaited and in step S6 the elapsed time is checked. If either a cancel command or no command (timeout) is received, the process returns to step S3 to await another order command. On the other hand, if the accept command is received in step S5, the process goes to step S7 for the final phase, and then returns to step S3.

FIG. 5 is a flowchart of the particular sales transaction described above. It begins in step S10, when the subscriber 8 walks into the store 14 and the PAD 10 receives the inquiry. In step S12, whether the subscriber 8 wishes to communicate with the store 14 digitally or not is determined in accordance with the subscriber's profile in a procedure possibly involving a command. If a positive answer is received, in step S14 the preparation phase takes place wherein the store RV 16 and the PSP 12 set up the preliminary protocols under the control of the PSN 22 and the PSP 12 prepares the initial list of RVs, as described above. The process than waits in step S16 until an item has been scanned by the register. During this interval, the RV 16 can communicate sales information, such as special sales or product locations, for the subscriber's review, and the PSP 12 can, under the conditions of the profile, query the store 14 for information.

Once an item is scanned, the RV 16 requests authorization from the subscriber 8 to set up the transaction, i.e. an order command. The process again waits in step S20 and, if this authorization is received, the setup phase begins with the PSP 12 requesting payment authorization from the financial institution RV 20 in step S22. If this authorization is received in step S24, the PSN 22 gathers the responses and confirmations in step S26, and then awaits a cancel command, an accept command or a time out in steps S28 and S30, which respectively correspond to steps S5 and S6 of FIG. 4. The PSN 22 finishes the transaction in step S32 if an accept command is received, corresponding to step S7 of FIG. 4.

If at any time before giving the final authorization in step 24 the subscriber 8 leaves the store 14 or cancels the transaction, the entire process is nullified.

All communications/transactions among the subscribers, RVs and PSPs within the PSN have their documents encrypted with the respective embedded IDs to provide security from others while permitting each participant access to his part of each document. Since the subscriber is the originator of any transaction, he has the ultimate say in who receives what information.

It will further be noted that in this and all other examples of the operation of the systems in accordance with the present invention, the precise order of steps taken or the precise identity of which RV or PSP sends a communication to another is not important, provided the transaction is achieved under the control of the PSN with the desired levels of privacy desired by the participants with full PSEC.

Figure 6:
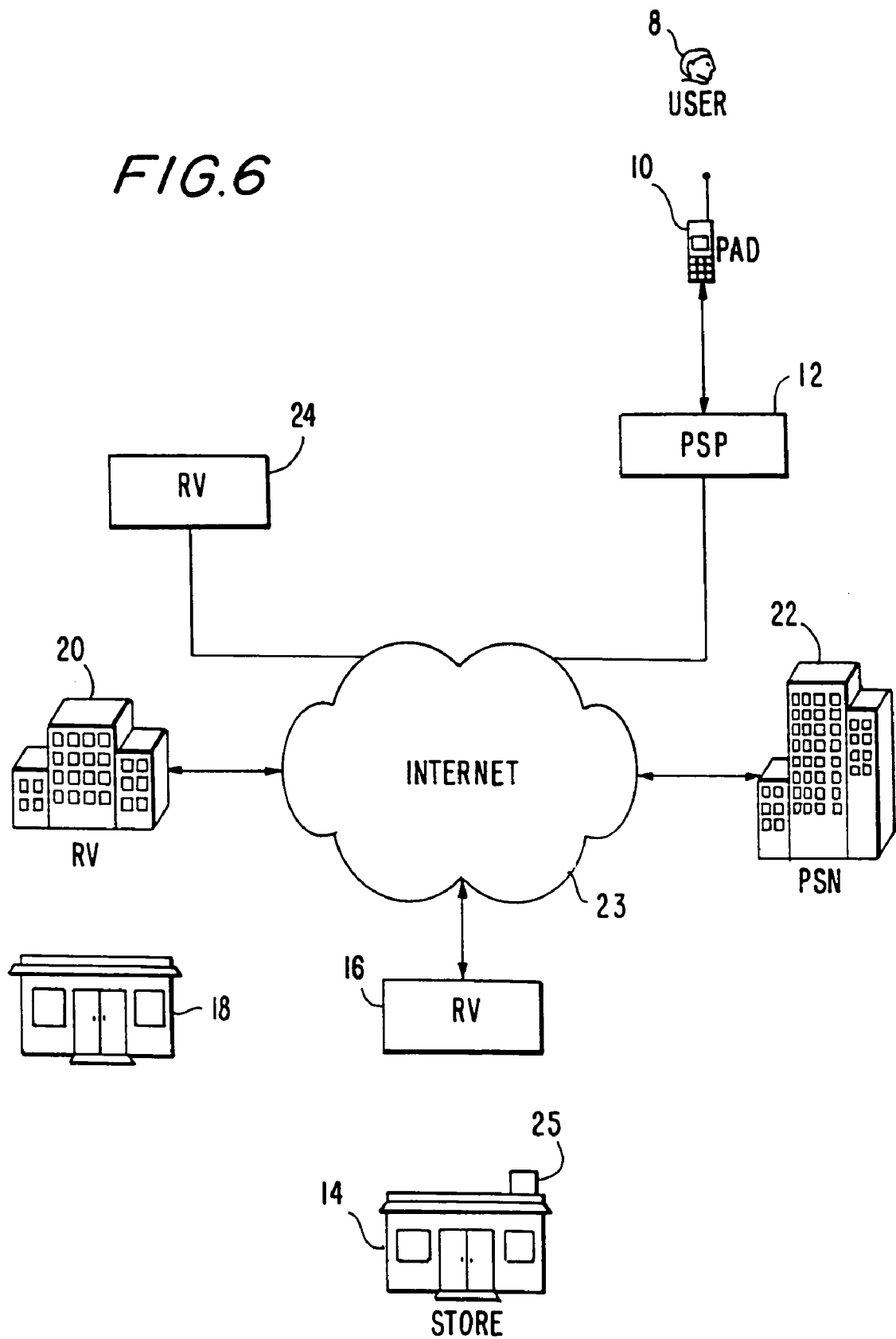
FIG. 6 is a view of the configuration of an embodiment of the present invention for a modified sales transaction.

A further development of this application involves the collection of sales tax. Today, each store is required to know what items are subject to sales tax, to collect the sales tax and to forward the collected money to the appropriate tax authority. This can result in significant costs in paperwork and lost manhours to the store, as well as possible tax penalties if there is any shortfall. The present invention solves all these problems by adding the tax authority itself to the system as an RV 24. FIG. 6 illustrates this configuration of the system. In this transaction, the subscriber's private data identifies his address and hence the sales tax and the appropriate tax authority, e.g. New York State. The authorization sent from the PSP 12 to the financial institution RV 20 includes this information. Upon receipt of this supplemented authorization, the RV 20 sends an additional message over the PSN 22 to the tax authority RV 24, saying in effect, "I am giving you credit of xxx dollars based upon a sales transaction to a customer subject to New York State sales tax." Accordingly, the tax authority gets its payment, but without the vendor knowing the identity of its customer.

In some jurisdictions, the customer is entitled to deduct paid sales tax from his income taxes. If the subscriber 8 wishes to get credit for the sales tax for this transaction, he can set his profile so that his PSP 12 instructs the RV 20 to make the message to the tax authority RV 24 say in effect, "I am giving you credit of xxx dollars for a sales transaction to Mr. \_\_\_\_\_, Social Security #\_\_\_\_\_." This gives the subscriber 8 due credit for the sales tax paid.

Figure 7:
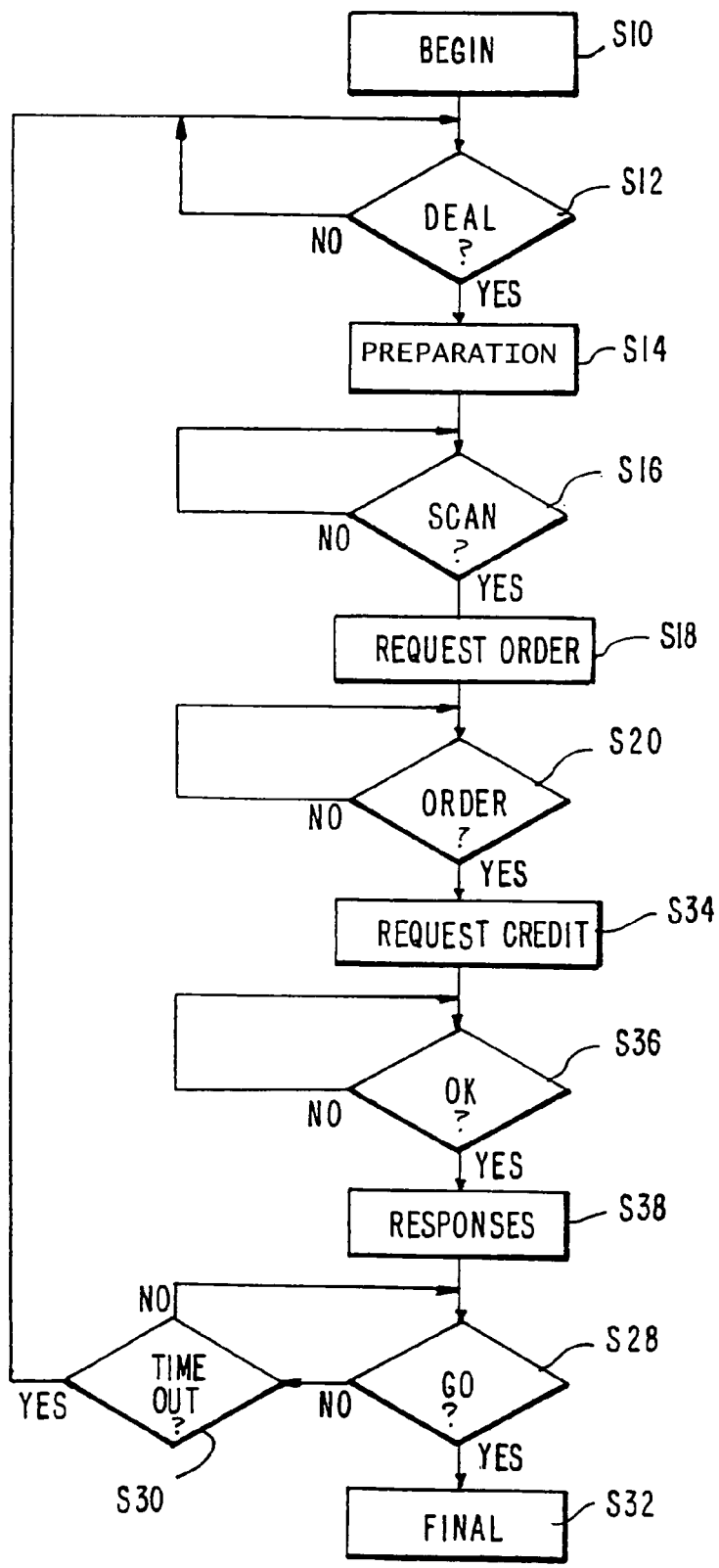
FIG. 7 is a flowchart of the transaction of FIG. 6.

This operation is shown in FIG. 7, which is a flowchart of this transaction. FIG. 7 is identical to FIG. 5 except for the replacement of three steps. After an order command has been sent, in step S34, which replaces step S22, the PSP 12 asks the financial institution RV 20 to authorize not only payment of the price to the store RV 20, but also payment of the sales tax to the tax authority RV 24. In step S36, which replaces step S24, the RV 20 must authorize both payments. In step S38, which replaces step S32, there is an additional process in which the tax authority RV 24 is sent the sales tax information and credit.

Figure 8:
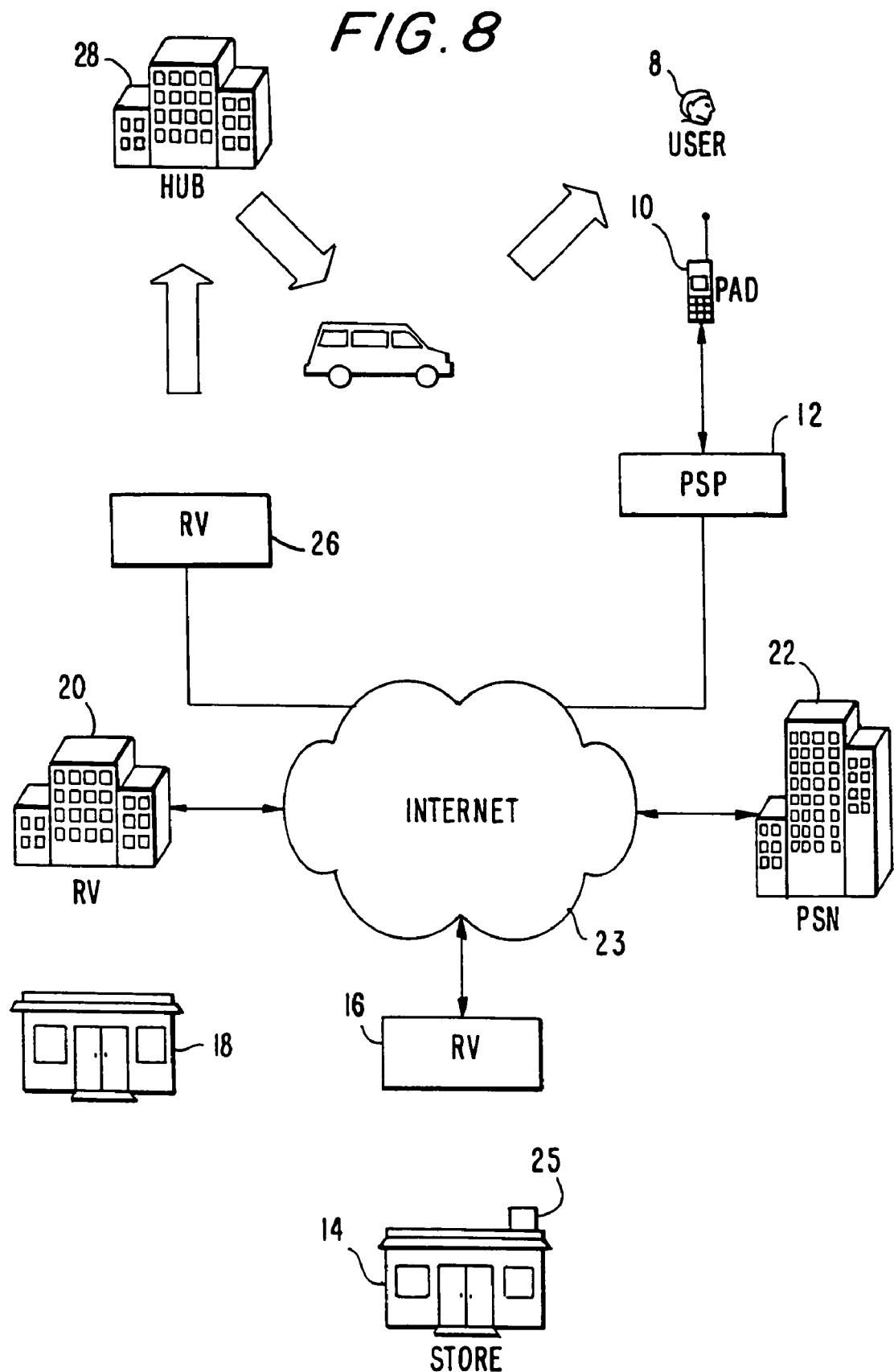
FIG. 8 is a view of the configuration of an embodiment of the present invention for a further modified sales transaction.

A still further development arises if the subscriber wishes the item to be delivered to his home. As in the previous example, the answer lies in utilizing another RV, here an RV 26 servicing a delivery company such as, for example, United Parcel Service (UPS)®. The configuration for this example is illustrated in FIG. 8. As shown therein, after the store RV 16 has received its credit from the financial institution RV 20, it notifies the subscriber's PSP 12 that it will use UPS to deliver the item. The PSP 12 sends a message to the UPS RV 26 at the UPS hub 28 covering the home address of the subscriber 8 saying, in effect, "You (UPS hub) will be receiving a package from the store 14 directed to customer #70 for a transaction (identified by, e.g. a time or a transaction number), and I am that customer. Please forward the package to me." Correspondingly, the store 14 prints a label with customer #70 and the transaction identification and sends the package with the label to the UPS hub 28. The store RV 16 also sends a message to the RV of its own financial institution, here assumed to be RV 20 of financial institution 18 for simplicity, authorizing the RV 20 to issue credit to the UPS RV 26 to pay for its delivery service. The RV 20 then sends a message to RV 26 notifying it of this credit. When the UPS hub 28 receives the package from the store 14, it prints its own label with subscriber 8's home address and forwards the package on.

It will be noted that, in these procedures, the store 14 and its RV 16 never know the identity of the subscriber 8, his credit card number, his financial institution or his home address. The financial institution 18 and its RV 20 never know what the subscriber 8 has purchased (nor do they know any of the subscriber 8's personal information from this transaction other than his account number, although they might know such information from the subscriber 8's initial application for credit). UPS also never knows what the subscriber 8 bought, how much he paid or how he paid for it. Accordingly, the degree of privacy provided by the system in accordance with the present invention is quite remarkable.

For a further degree of privacy, another RV could be added that manages payments for the subscriber 8, so that the financial institution's RV 20 need not know the identity of the store 14. This is discussed further below.

Figure 9:
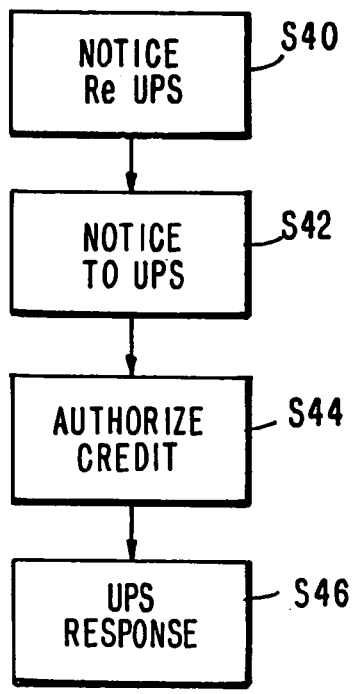
FIG. 9 is a flowchart of part of the transaction of FIG. 8.
Figure 10:
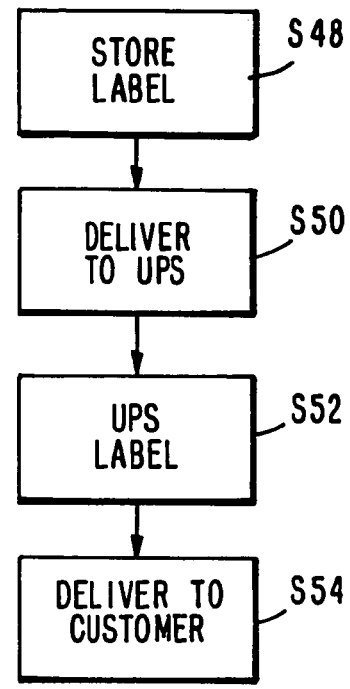
FIG. 10 is a flowchart of another part of the transaction of FIG. 8.

The delivery operation is shown in FIGS. 9 and 10, which are flowcharts of this transaction. Here, some of the delivery steps are part of the setup phase supplementing step S36 and some are part of the final phase supplementing step S38. Step S36 is considered to include the steps of FIG. 9. In step S40, the store RV 16 notifies the PSP 12 that it will use UPS RV 26 for delivery. The PSP 12 notifies RV 26 in step S42 that it is expecting a delivery, and in step S44, the RV 16 authorizes payment to the UPS RV 26 through its financial institution RV 20, in steps similar to steps S34 and S24. In step S46, the UPS RV 26 accepts the job (if it has received payment authorization and can deliver to the subscriber 8).

Correspondingly, step S38 is considered to include the steps of FIG. 10. In step S48, the store 14 prints the store label, in step S50 the item is sent to the hub 28 using the store label, in step S52 UPS RV 26 prints a UPS label, and in step S54 the item is delivered to the subscriber 8 using the UPS label.

In a completely different type of application, the present invention provides privacy in the context of instant messaging. As is well known, in instant messaging systems each operator may have a "Buddy List" of other people who are currently logged on to whom his messages are sent. It may be that a subscriber wishes to send messages to his buddies, but does not want each of his buddies, or anyone else, to know who is on the Buddy List. The subscriber might also wish to keep the content, or even the existence, of his conversation private. Instant messages are encrypted with the sender's and recipient's PSIDs, so that no logging or history tracing would be possible.

Figure 11:
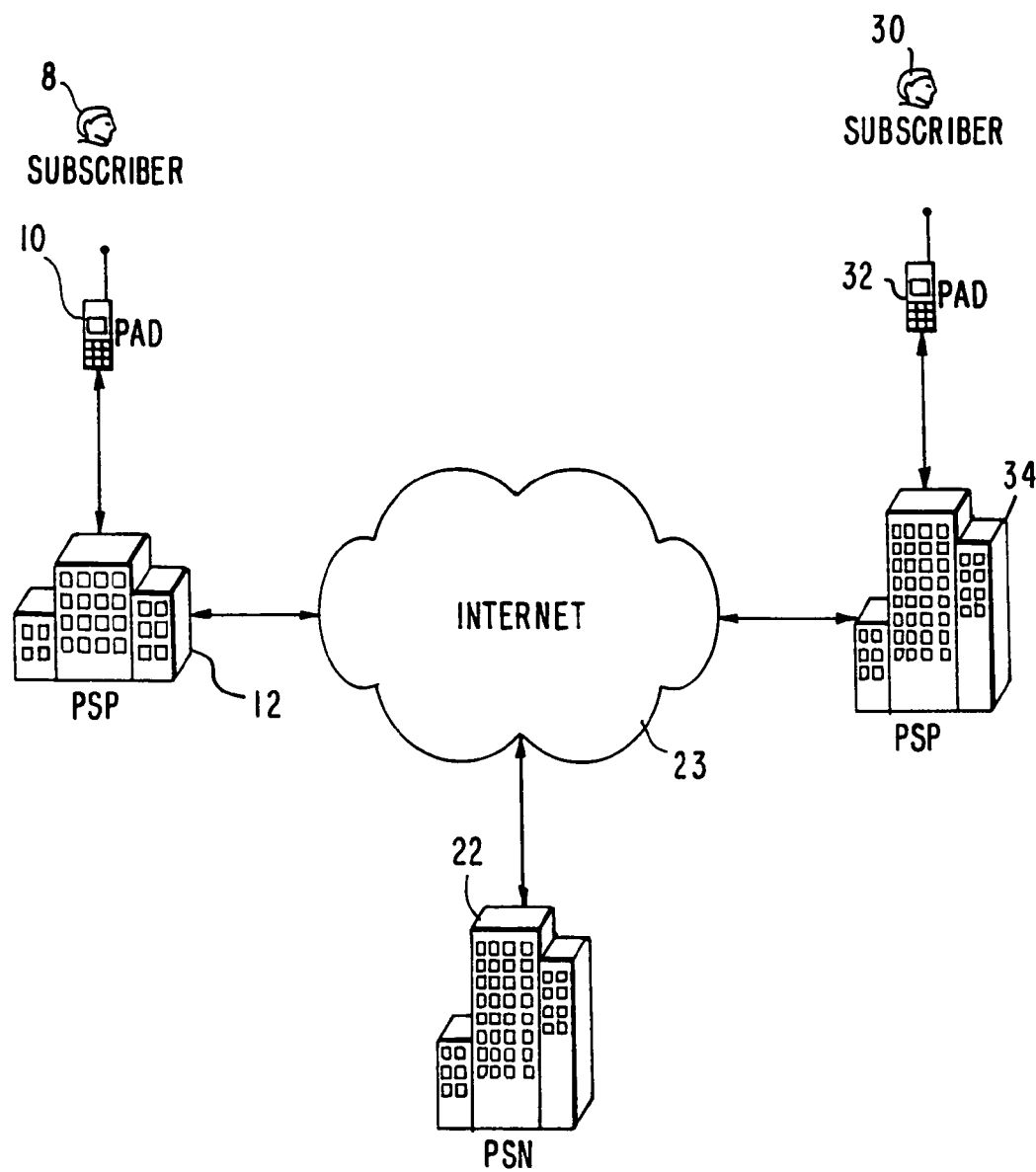
FIG. 11 is a view of the configuration of an embodiment of the present invention for an instant messaging communication.

FIG. 11 illustrates a configuration of a system in accordance with the present invention for carrying out this transaction/communication. Here, subscriber 8, his PAD 10 and PSP 12 are joined by a second subscriber 30, his PAD 32 and his PSP 34. Subscriber 8 keeps his Buddy List in his profile or in his private data, and PSP 12 identifies subscriber 30 by the address of his PSP 34 and by identification information that PSP 34, and no other entity, not even PSP 12, can use to identify PAD 32. This identification information was obtained by PSP 12 from PSP 34 in an initializing operation for adding subscriber 30 to the Buddy List.

Figure 12:
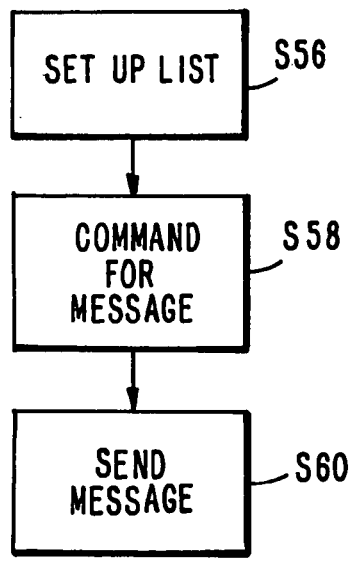
FIG. 12 is a flowchart of the communication of FIG. 11.

This operation is shown in FIG. 12, which is a flowchart of this transaction. In step S56, the subscriber 8 sets up the Buddy List in his profile. In step S58 he sends a command through his PAD 10 to send a message with his own and the recipient's PSID, and in step S60 the PSP 12, under the conditions set by the profile, sends the message. In this way, no one else can read the message or know who sent it or to whom it was sent.

Advantageously, where a person is carrying an electronic device with private information, if the device receives a signal asking for the private information, instead of immediately transmitting the information, the device should ask for approval to transmit by, for example, generating a predetermined type of signal and then wait for a response from the owner of the device. If the authorizing response is received, then the private information is transmitted as per the received request. On the other hand, if the owner does not register approval in the proper manner, the device should not send the private information.

From the above examples, it will be seen that the present invention advantageously provides this feature in preventing personal or other desirably private data from being transmitted without first sending some type of signal to the owner of the data, at his PAD or at his PSP, so that the owner can make a specific determination in each particular case as to whether the data should be transmitted and in what manner it is to be handled, including storage, future use and distribution.

In a manner of speaking, the present invention controls the flow of electronic data just as the user is able to control the flow of written or spoken data that is in the user's pocket or in the user's memory. If somebody asks for your social security number and you have it written on the card in your pocket, you can make an affirmative decision yes or no as to whether to give the card to the person requesting the information. The present invention provides the same type of procedure for transmitting electronically stored digital data.

In another heuristic image, the PSN 22 is like the plumbing of a water system and the profile is like the subscriber turning certain taps on or off. Together, but under the ultimate control of the subscriber 8, the PSN 22 and the profile determine where different types of information (hot or cold water) are sent.

The above examples demonstrate a further advantage of the present invention. As a transaction becomes more complicated through the addition of new parties or the requirement of new goods or services, or when it seems that there is a problem that the pending configuration cannot handle, then the new issues and/or problems can always be handled by the addition of one or more RVs, either in series or parallel with the existing RVs and PSPs connected over the PSN.

Figure 13:
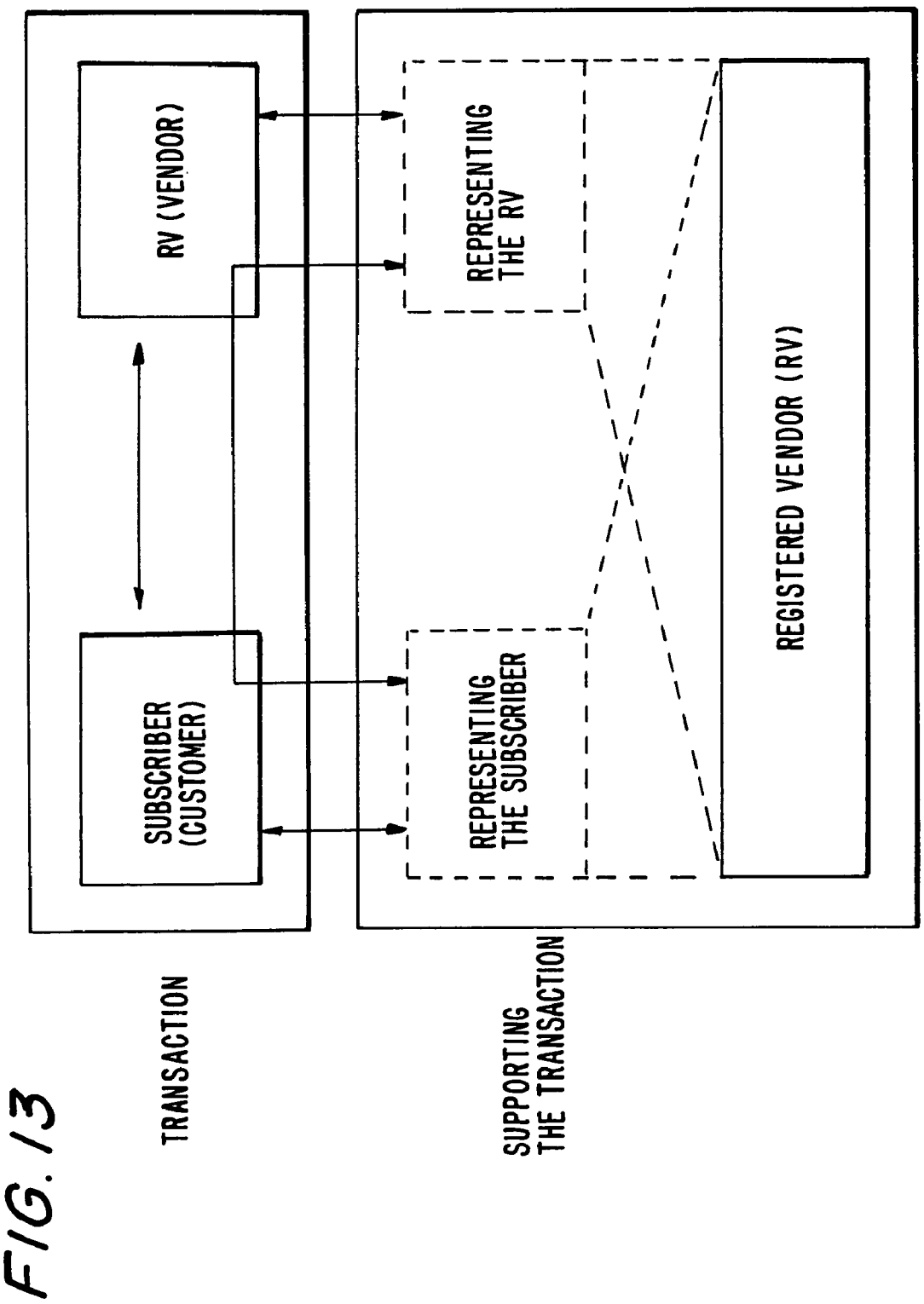
FIG. 13 is a conceptual view of an operation of the present invention.
Figure 14:
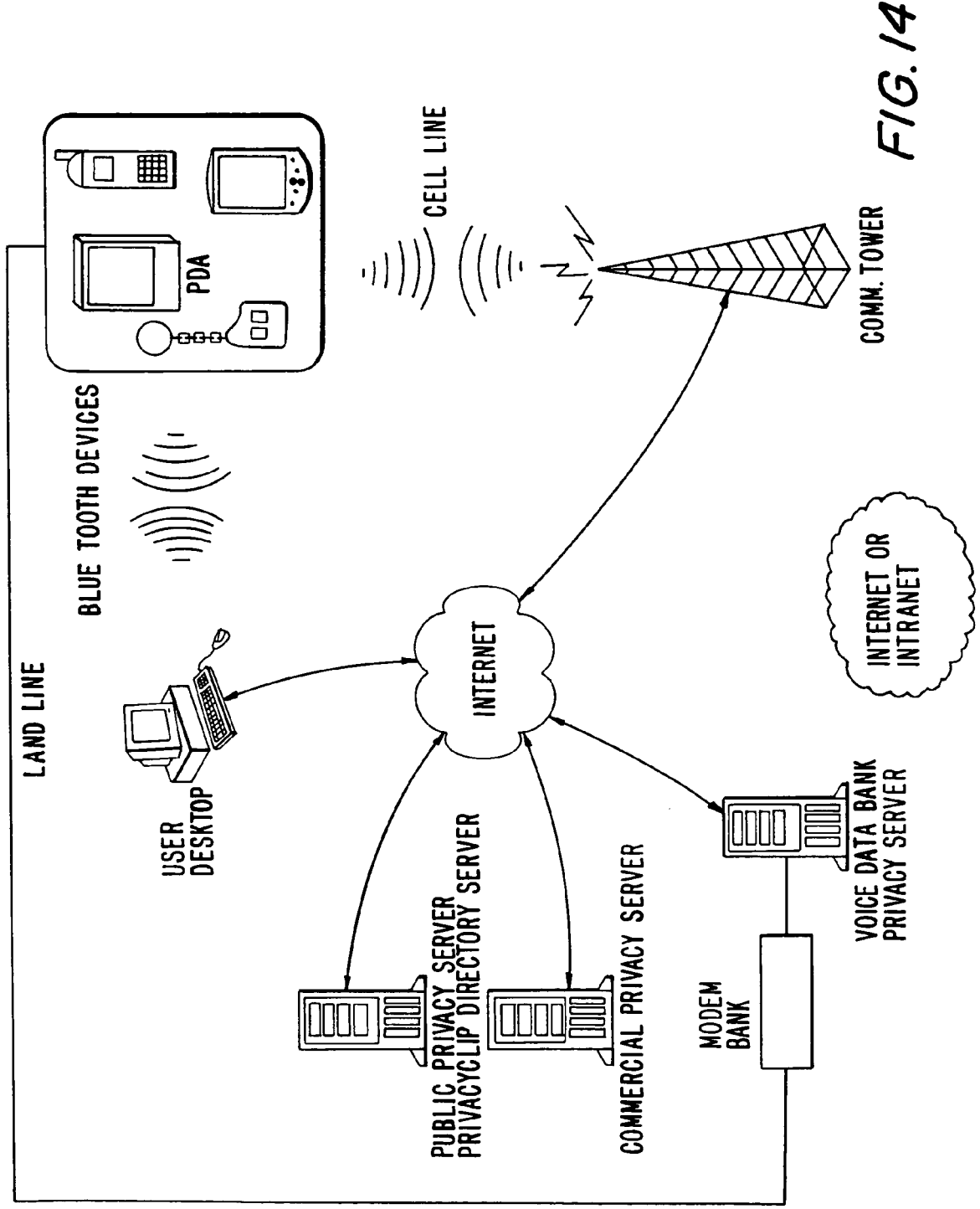
FIG. 14 is a conceptual view illustrating possible communication paths among the apparatuses used in a system in accordance with the present invention.

FIG. 13 illustrates the privacy operation of the present invention, wherein the transaction takes place on one level as far as the parties are concerned, while the privacy support takes place on another level, essentially invisible to the subscribers, with separate entities or portions of entities representing the parties. FIG. 14 illustrates possible communication paths among the apparatuses used in a system in accordance with the present invention, as well as different forms for the PAD.

Before further describing the preferred embodiments of the invention, the following Glossary presents the following abbreviations that may be used interchangeably with, and have the meaning indicated by, the associated terms, where unconventional terms are defined in this application as necessary:

Glossary of Terms

| | |
|---|---|
| PSN | Privacy Shield Network |
| PSNS | Privacy Shield Network Server |
| PSP | Privacy Service Provider |
| PSPS | Privacy Service Provider Server |
| RV | Registered Vendor |
| PVS | Privacy Vendor Server |
| PAD | Personal Access Device |
| PSNR | Privacy Shield Network Rules |
| SPP | Subscriber's Personal Profile |
| PSID | Privacy Subscriber ID |
| PVID | Privacy Vendor ID |
| PTID | Privacy Transaction ID |
| PMID | Privacy Message ID |
| PDID | Privacy Document ID |
| PSPID | Privacy Service Provider ID |
| VPNS | Virtual Private Network Space |
| SPDR | Subscriber's Personal Data Records |
| HPS | Home Privacy Server |
| PT | Privacy Transaction |
| PM | Privacy Messaging |
| PBM | Privacy Broadcast Message |
| PA | Privacy Alert |
| PN | Privacy Notification |
| PE | Privacy Encryption |
| PD | Privacy Document |
| PSEC | Privacy Security |
| PXML | Privacy XML |
| XML | eXtensible Markup Language |
| RF | Radio Frequency |
| PKI | Public Key Infrastructure |
| ROM | Read Only Memory |
| EFT | Electronic Funds Transfer |
| LAN | Local Area Network |
| WAN | Wide Area Network |
| www | World Wide Web |
| PDA | Personal Digital Assistant |
| RAM | Random Access Memory |
| CPU | Central Processing Unit |

A more detailed description of certain elements of the system in accordance with the present invention will now be presented.

As used herein, the term "registered vendor" (RV) means any individual or entity that provides goods and/or services, including information or privacy services, that is registered by or with the operator of the PSN, having agreed to abide by the PSNR. An RV can be any form of business, such as a retailer or wholesaler operating from conventional storefront or warehouse locations, or a merchant that operates exclusively utilizing the Internet in connection with advertising, order taking, order confirmation and fulfillment and the like.

An RV can be a municipality, a tax authority (e.g. the IRS), a utility (e.g. a gas and electric service provider), a transportation authority (e.g. toll bridges, tunnels and roads), a telecommunications provider (e.g. telephone, Internet access, cable television), a transportation provider (e.g. trains, buses, subways), a financial services company (e.g. a bank, stockbroker). or other entities using the PSN support facilities. Indeed, any individual or entity that can conduct business or otherwise utilize the Internet for communication is defined herein to be a "vendor" and potentially can become a registered vendor. A registered vendor can be required to pay an application fee, a registration fee, a transaction fee, a periodic (e.g., monthly) membership fee, and/or other consideration to the operator of the PSN in order to maintain its status and the opportunity to communicate with subscribers.

As noted above, the RV agrees by written contract or otherwise, to be bound by rules established either by the subscriber in its communications and/or data transmissions, or by general rules established by the PSN operator. Failure to abide by these rules can result in the cancellation of the RV's access to the PSN. For example, a subscriber can provide to an RV the personal information required to complete a purchase transaction, e.g., shipping address and credit card information, but the subscriber can also include a notice, such as one or more flags, that some or all of the information is to be used only for this single transaction, or in a particular way in this transaction, and is not to be retained and/or used for any purpose in the future. The PSN operator can undertake audits of RVs to determine compliance and to assure that any corrective action necessary is actually undertake by the RV. The following are examples of instructions provided by the subscriber to any or all RVs run the gamut of privacy for a given data transmission:

1. Destroy data after transaction;
2. Store data for archival use only;
3. Data may be used in house only;
4. Data can be distributed to a limited number or class of RVs;
5. Data may be distributed to all RVs and outside entities.

The RV has agreed to abide by these instructions and the PSN will enforce this contract.

Figure 15:
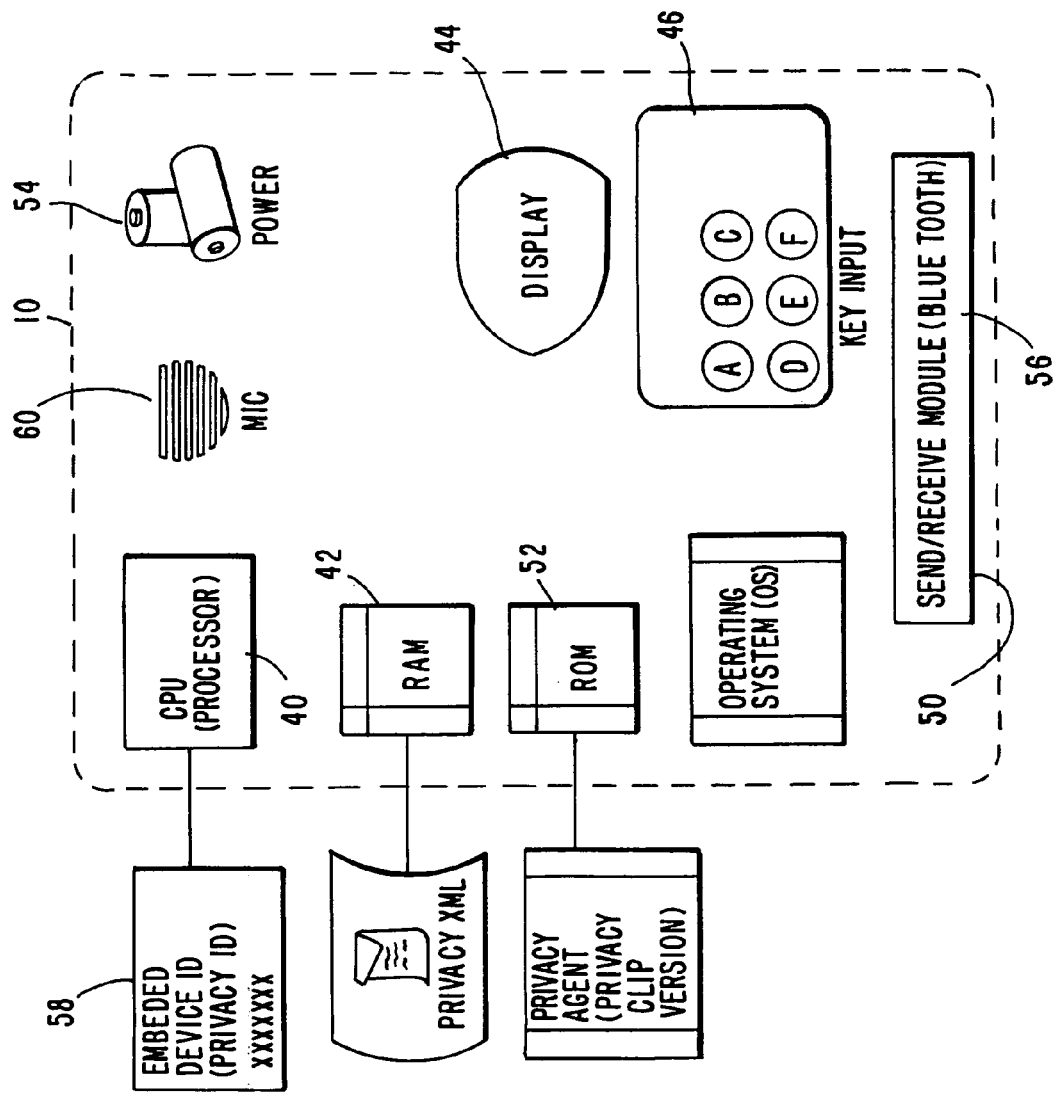
FIG. 15 is a view showing the construction of a PAD.

The PAD will now be described. Although the PAD stores the subscriber's profile, this is generally used as a backup, and the PAD is used to establish access to the subscriber's profile and private data that is stored on the PSP server, as well as other files that are maintained thereon. The subscriber's files can also be maintained in whole or in part on one or more PCs, laptops, or portable computers, and on any other devices having at least comparable functional capabilities. The subscriber has the option of providing access to these files, whether encrypted or not, only when the PAD is in close proximity to these devices. As illustrated in FIG. 15, the subscriber's PAD 10 advantageously comprises the following:

1. a computer having a processor 40, addressable memory 42, output device(s) 44, input device(s) 46, a network interface 50 and a storage device 52;
2. a battery 54;
3. a wireless RF communication chip 56; and
4. an encryption key embedded in (removable) ROM 58.

The elements comprising the computer are preferably miniaturized on a chip in order to minimize the overall dimensions and weight of the housing for the PAD. The subscriber's PAD is preferably in the form of a small, easily portable, hand-held unit. In a preferred embodiment, the PAD can conveniently be carried on the subscriber's person, e.g., in clothing, a handbag, or other carrying case such as the waistband case used for a cellular phone. The subscriber's PAD can take the form of a somewhat enlarged fountain pen that can be provided with a clip for carrying in the user's shirt or jacket pocket. The PAD can also be housed in a cellular phone as an additional separate component. Preferably, the PAD is integrated into a cellular phone, thereby providing another means of communicating with the PSP via the Internet.

In another embodiment the PAD is combined with a personal digital assistant (PDA) or a portable electronic voice recording device, thereby providing additional functions. The PAD can be incorporated as a module or expansion pack to PDAs such as PALM®, VISOR®, or PocketPC® that are adapted to receive expansion packs in the form of PCMIA or other expandable memory form. The subscriber's PAD can also be provided in the form and with the general appearance of a credit card, an attachment to a key chain, or any other configuration as may be dictated by fashion, style and the personal preference of the subscriber.

In a further preferred embodiment, the PAD is also provided with a viewing screen, a key pad or plurality of function-controlling keys which can generate commands, and in-coming message signaling means, where the signal can be audible, visual, vibratory or any combination of these. Advantageously, the PAD further includes an audio-microphone 60 and a voice recognition program to convert voice communications to digital code that can be stored for later communication to a web-connected device, such as a PC, for secure storage and/or display, as disclosed in U.S. Patent Application No. 60/181,431 to the present applicant. The PAD can also be programmed to create a biometric voice print for a password enunciated by the subscriber before allowing some or all transmissions. This method is especially suited for use when the PAD is in a cellular telephone and the voice print could be stored on the PAD's PSP.

The PSP will now be described. The PSP is advantageously embodied in a network server with any necessary functional and operational support structure. The PSP is connected to the Internet, over which it is in communication with other PSPs, the RVs and the PSN. Like the RVs, each PSP must be registered with the PSN and must follow whatever rules are set by the PSN operator to ensure the subscribers receive their transaction privacy. Also, like the RVs, the PSPs have respective PSPIDs for encryption and security. For absolute privacy, the profile and/or the private data could be stored on the PAD only.

In a preferred form of practicing the invention, the communication between the PAD and its PSP is made in the XML language and other XML technologies. XML is a conventional, well-known open source code program language that is capable of communicating both data and meaning. XML is designed to allow the user/developer to modify or manipulate the logic for subsequent data processing in addition to making changes to the data itself. In this regard, XML functions in a manner that is different from HTML and even the earlier SGML (Standard Generalized Mark-Up Language). In a preferred embodiment, the XML is stored on the subscriber's PC and on the PSP, but the XML can be maintained solely on the PAD and accessed as part of the subscriber's logging-on procedure.

Communications with the subscriber's PAD can be established by any known means available today or that become available in the future. In addition to the preferred mode of short-range radio frequency utilizing the protocol commonly identified as "Bluetooth," other forms of wireless network and Internet access can be utilized. Various wireless Internet access services are provided via direct linkage to orbiting satellites. Other wireless systems operate through cellular phone systems. In a further alternative, the subscriber's PAD can also be provided with an output device to accommodate a hard-wired plug connected to the subscriber's PC, or other electronic device adapted to establish communications with the Internet via established telephone lines.

In one method of operation, the subscriber uses the PAD as a means of communicating with at least one PC maintained by the subscriber. The subscriber's PC is linked to the associated PSP via a wide area network (WAN), a local area network (LAN), or directly via the Internet through the World Wide Web.

Preferably, the PAD includes encryption means, for example PKI or digital certificates in conjunction with the PSID, for generating a unique encrypted signal by which the subscriber can access his or her file in order to enter personal information and to select and/or independently establish a protocol for the transmission of information from and to the subscriber's private data. The transmission of information from the subscriber's private data can be limited to communications between the subscriber and, at the subscriber's sole discretion, any number of third-party RVs that are permitted by the PSN operator to establish communications with the PSP.

In a further preferred embodiment, only the subscriber can access the subscriber's private data encrypted utilizing the PSID as encryption means, and even the associated PSP cannot access this private data without express authorization. In a further aspect of this preferred embodiment, the subscriber's profile can establish that any attempt to access the private data utilizing encryption/code-breaking methods or apparatus will result in the destruction of the subscriber's private data. In the case where the subscriber keeps his private data only on his PAD, loss of the PAD containing the encrypted private data will terminate access to the subscriber's private data file, and the subscriber will have to apply for and create a new personal file.

Upon receipt of the encrypted PAD, a subscriber accesses the VPNS on the PSP server and proceeds to establish the subscriber's personal profile (SPP). The SPP can include the identification or "tags" corresponding to personal and professional interests such as hobbies, financial information relating to specific companies, sporting events and specific teams, health news, including specific conditions or treatments, food/cooking, including special diets, ethnic dishes or recipes; and any of a myriad of other such preferences or areas of interest. Likewise, the subscriber can identify subjects or products which are to be excluded from the areas of interest, such as pornography, recreational, social or cultural events, fundraising solicitations and the like. All such information, personal preferences and exclusions are part of the subscriber's profile. The subscriber's profile is compared to the subject matter of incoming RV advertisements, solicitations, news items and the like to either screen or exclude them or to notify the subscriber that an RV communication of potential interest is available for viewing/transmission. At such time as an RV communication is determined by the PSP server program to match one or more entries on a subscriber's profile, a signal is transmitted which is ultimately received by the subscriber's PAD and/or PC, thereby activating one or more of the signalling devices. The subscriber can then access the PSP via his PAD or PC to investigate the originating RV, the general nature and subject matter in the RV's communication, and if desired, gain access to the full text/graphics of the RV's communication. The same process will be repeated for multiple communications stored for accessing by the subscriber on the server.

Regardless of the particular form or housing of the subscriber's PAD, an important element in its construction and in the practice of the method of the invention is an embedded computer ROM chip that includes an embedded PSID for subscribers, or a PVID for RVs or a PSPID for PSPs, and a secure form of encryption that is used to encrypt the data files and the data streams to assure that only the subscriber's PAD and/or the RV can read or write to the data files and/or data streams incorporating the PSID and/or the PVID and/or the PSPID as part of an encryption algorithm.

Figure 16:
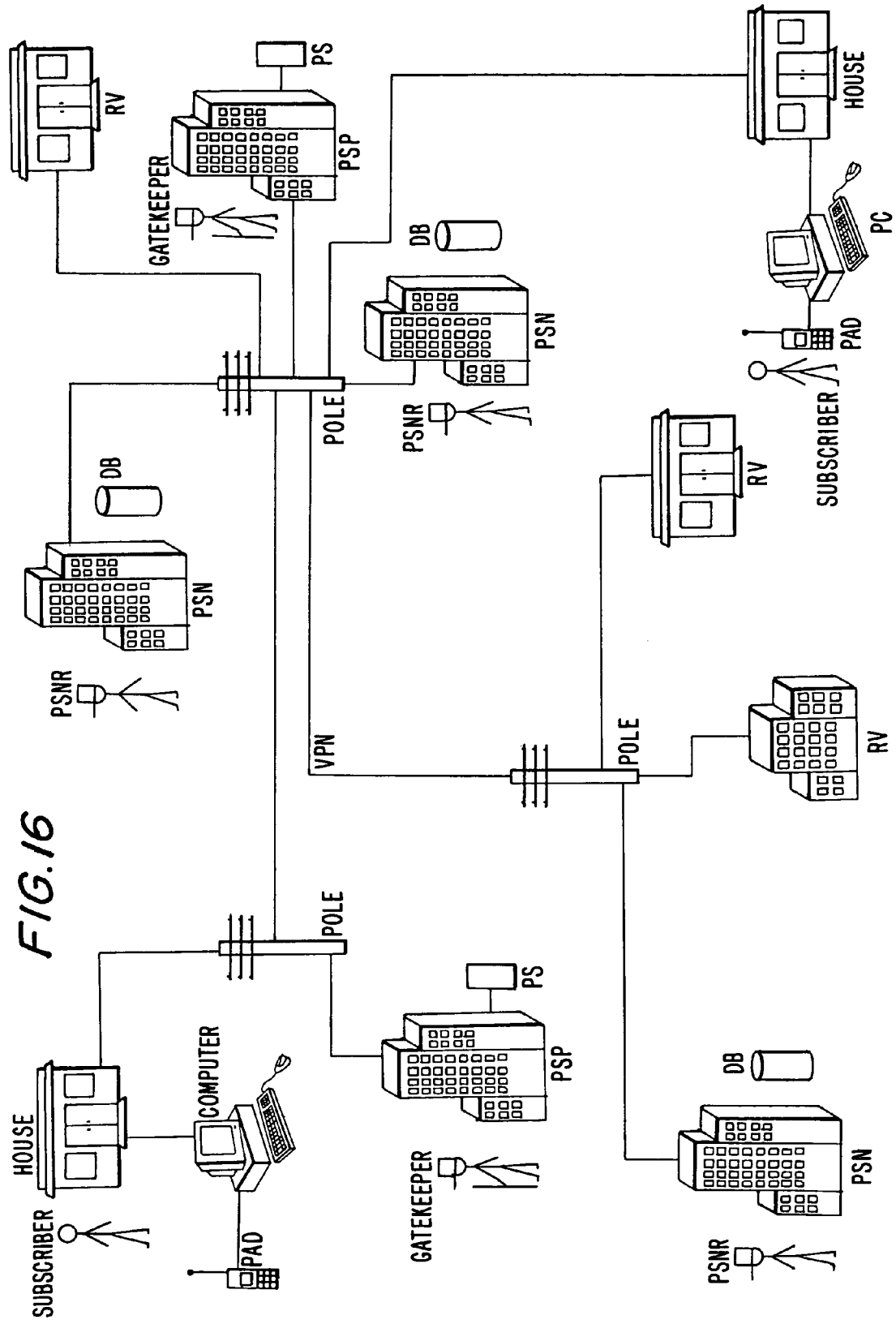
FIG. 16 is a conceptual view of communications using the PSN on a virtual private network.

As shown in FIG. 16, the PSN, RVs and PSPs communicate via the conventional virtual private network (VPN) in conjunction with the embedded IDs.

After the subscriber has established his account with the operator of the PSN and has received the uniquely encrypted PSID that will afford him with access to his personal file on the PSP, the subscriber proceeds to establish the rules of privacy, including the subscriber's profile. By using XML technologies to store data, each subscriber is able to establish, in a more technically versatile way, a unique set of rules which will govern access to information in the subscriber's private data, the manner and frequency with which the subscriber will be notified of registered vendor communications, the manner in which such communications are displayed and other protocols relating to the subscriber's interaction and interfacing with the RVs.

By way of example, the rules or protocol can include such details as the identification of third-party addressees from whom alert signals should be accepted on a 24-hour basis, e.g., certain family members, or in the instance of a medical doctor, transmissions issued to an emergency hotline address, or the like. Alternatively, signals indicating the existence of incoming transmissions can be excluded during certain times of the day, or for certain days, or from specified individual or classes of RVs, or the like. For example, a subscriber may establish a protocol that only authorizes the transmission of a signal indicating the receipt of a billing by the gas and electric company, telephone company, municipal tax authority, credit card companies and the like on weekdays after five p.m., regardless of when the RV's billing agency may have downloaded such information from its own computers, which quite possibly could be during the middle of the night when Internet access was more readily available.

The creation of a subscriber's personal profile also permits the subscriber to continuously change and modify the criteria for notifying the subscriber of advertising, solicitations and the like from registered vendors, depending upon the changing subscriber's interests and needs. For example, a subscriber can be interested in purchasing a new winter suit, or a fur coat, or a particular make and/or model of new or used car having specific accessories and not exceeding a specified price. This information can be entered in the preferences section of the subscriber's profile so that any incoming data transmissions from RVs are tagged using the XML protocol and compared to the subscriber's preferences. If there are one or more matches, then the subscriber is notified in accordance with the notice protocol which, for example, could be on weekdays after business hours and on weekends between specified hours. Once the subscriber's need has been satisfied or interest has ended, the item can be deleted from the profile and thereafter no matches will be sought with incoming data transmissions from RVs.

The PSN is operated so that no RV ever has a direct communication link with any of the individual subscribers' PADs only through the PSP, which screens its messages through the profile. More importantly, the subscriber's profile precludes the possibility that the subscriber will receive undesired communications, commonly referred to as "SPAM."

The PSN also operates so that even when two subscribers have PADs registered with the same PSP, there is never a direct link between the two subscribers. Each PSP is required, in this situation, to split itself into parts functionally, with one part representing one subscriber and another part representing the other subscriber. The two parts, each essentially a complete PSP as viewed from the subscribers' PADs, then communicate over the PSN when a transaction involves both subscribers. Thus, when one PAD wants to talk to the other, it goes to the PSP, which asks the PSN for the other's address. The PSN gives the address, which just happens to be the same PSP. In this way each part of the PSP remains ignorant of how the other part manages its subscriber profile and therefore cannot access this information. As a result, the desired privacy is maintained between these subscribers.

From the above description, it will be understood that the physical creation of the system in accordance with the present invention involves the following steps:
1. Set up the system of the PNS operator;
2. Set up PSNS at Internet backbone data centers distributed throughout the world at strategic sites;
3. Add RVs as goods/service providers to the network;
4. Add PSPs to the network; and
5. Sell/distribute PADs to subscribers.

Several different types of communications can be transmitted via the PSN, including the following:
1. Instant messaging, discussed above in an example with Buddy Lists, comprehends the communication of private or confidential communications to a specified group of addressees and provides for instant messaging.
2. Broadcast messages are sent by RVs to the PSPs, or between PADs, for screening by a server that compares the data in the message to subscriber profiles to determine which subscriber(s) will receive a notification that a message is available for transmission.
3. Notification Messages are established by an individual subscriber who specifies one or more categories of data that the subscriber wishes to receive and the scheduling for the transmission of such information or data. As used herein, a "notification message" is one that is delivered at a specified time or interval, or when the subscriber is in a specified place. An example might be the daily transmission of the subscriber's bank account balance at a specified time of each business day.
4. Alert Messages are established similarly to notification messages. An "alert message" is one that is delivered as soon as it is received. Examples include a message that the price of a specified stock reached a specified value, or that a facsimile or a voice mail communication has been received from a specified telephone number at a location remote from the subscriber.

In these and other notification or alert scenarios the PSP's server posts the inquiry to the RV's server (e.g., in the case of the bank balance), searches financial reporting service data bases (in the case of the stock valuation), or periodically interrogates the subscriber's voice mail/facsimile incoming record system.

5. Transaction Based Messages are the messages communicated during a transaction, with examples having been given above.

Figure 17:
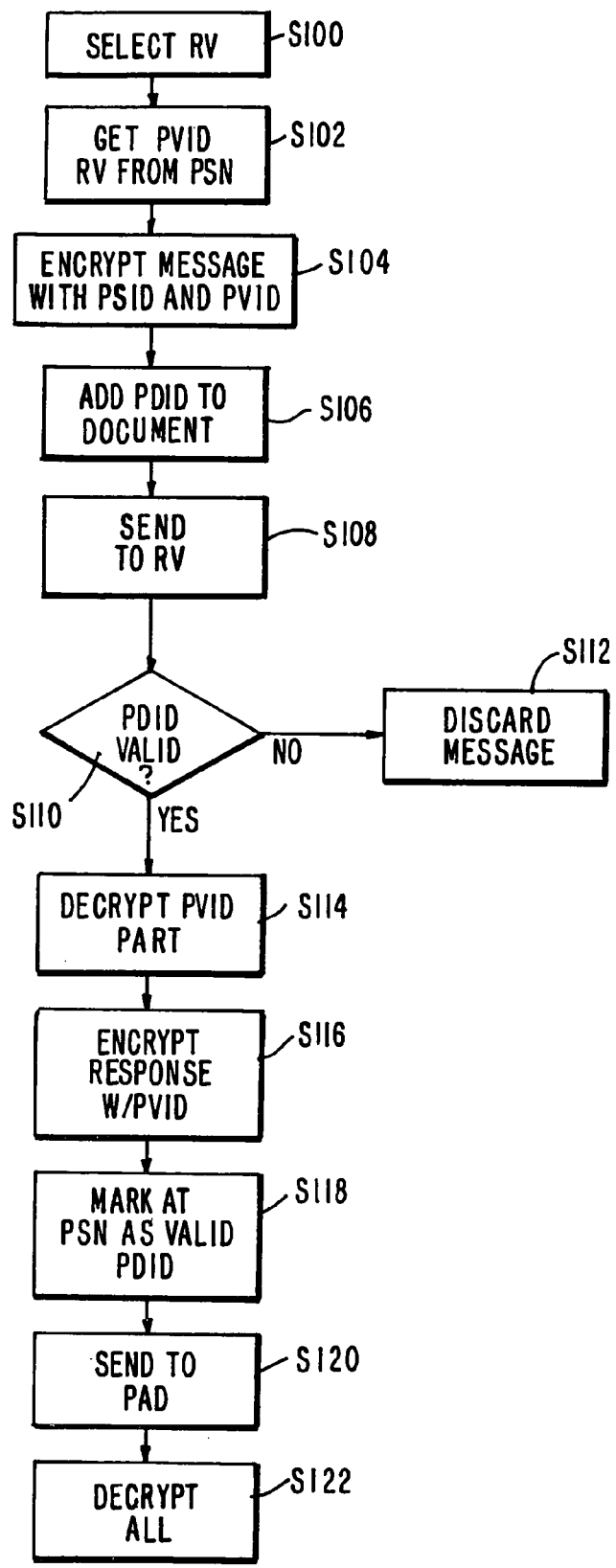
FIG. 17 is a flowchart of a transaction using encryption.
Figure 18:
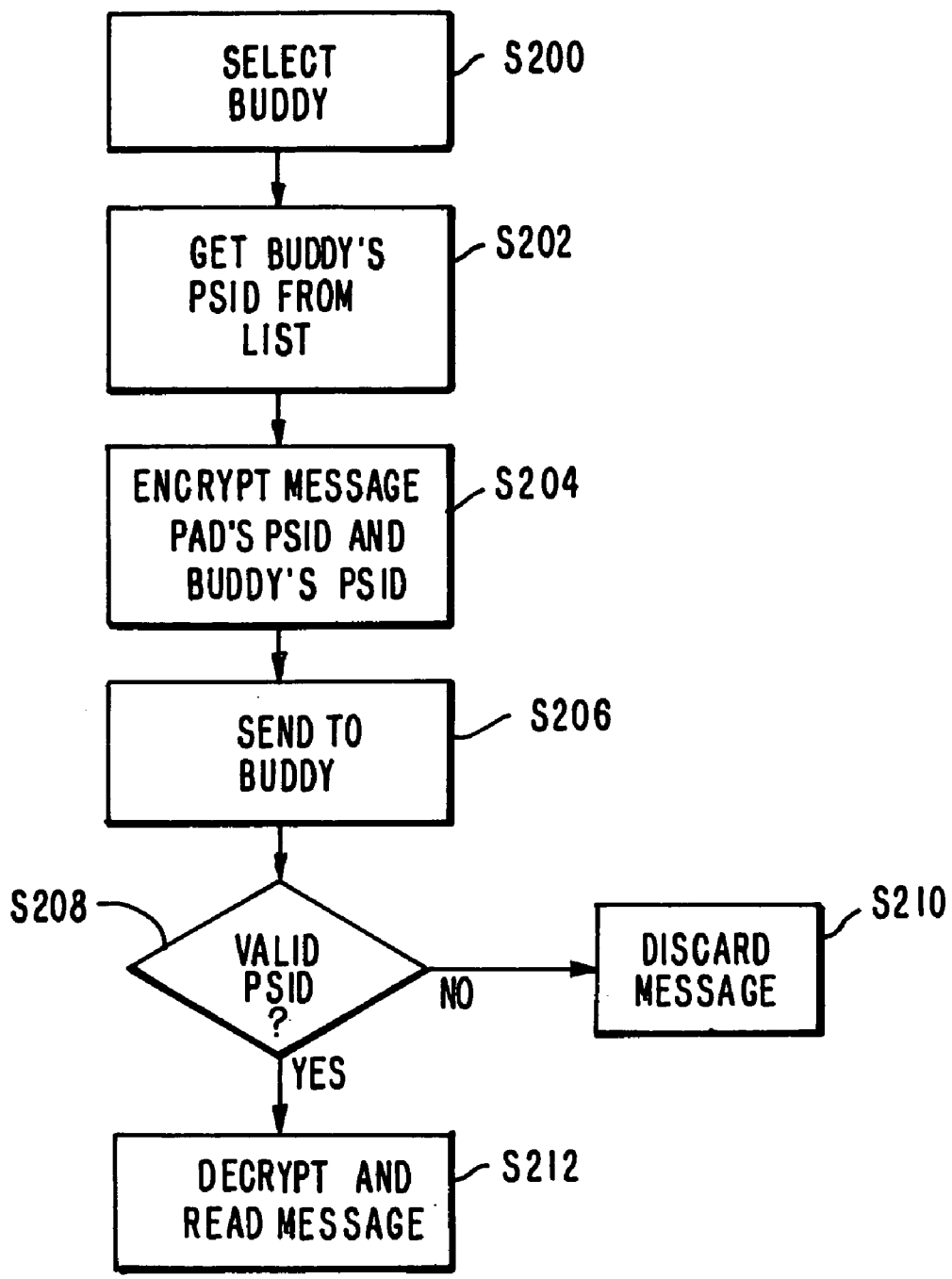
FIG. 18 is a flowchart of an instant message using encryption.

FIGS. 17 and 18 are flowcharts that illustrate the use of the parties' IDs in providing security for the privacy communications. FIG. 17 is a flowchart of a transaction between a PAD and an RV. The process begins in step S100 where the PAD selects which RV is to receive an encrypted method. In step S102, the PAD gets the PVID of the RV from the PSN and in step S104, the PAD encrypts the message using both his PSID and the PVID, using the PVID to encrypt only what the PAD wants the RV to know, and then the PAD sends the encrypted message to the PSN. In step S106, the PSN adds the document ID (PDID) to the message and in step S108 sends it to the RV. In step S110, the RV asks the PSN if the received message with the PDID has a valid PDID, i.e. whether this message was sent through the PSN from a valid sender. If the answer from the PSN is no, the RV can discard the message in step S112.

On the other hand, if the message is valid, in step S114 the RV can decrypt the part encrypted with its PVID and, in step S116, the RV prepares and encrypts a response using the PVID and the PDID, sending it to the PSN. In step S118, the PSN marks the response as having a valid PDID and in step S120 sends it to the PAD. In step S122, the PAD can decrypt the entire response, since the PAD was the originator of this transaction.

FIG. 18 illustrates another encrypted transaction, here a communication in instant messaging using a Buddy List. In this process, in step S200 the sender uses his PAD to select a buddy from his Buddy List and in step S202 the PAD gets this buddy's PAD's PSID from the list. In step S204, the PAD (or its PSP) encrypts the message using the PAD's PSID and his buddy's PAD's PSID. In step S206 the encrypted message is sent to the buddy's PAD using the PSN. In step 208, the buddy's PAD checks whether or not the message has a valid sender PSID, i.e. whether the sender's PAD is on the buddy's Buddy List. If not, in step S212 the message can be discarded. If the sender PSID is valid, in step S214 the message can be decrypted and read.

Thus, in each case, the use of the various IDs in encrypting the communications ensures that no others can decrypt the communications.

In one preferred embodiment, the PSP is programmed to notify a subscriber only when the subscriber has established a profile that identifies at least one subject matter preference and/or RV from which the subscriber wishes to be notified of a communication. In this embodiment, even though a subscriber has opened an account and received a PAD, in the absence of an established profile on the PSP server, the subscriber will receive no in-coming notices.

Another example of the notification or alert mode of operation using the method of the invention can also be utilized for the notification, billing and processing of payments without the disclosure of credit card, debit card or bank account information and without disclosing personal identification numbers (PIN) or other such indicia. For example, service providers such as public utilities, telecommunication companies and municipalities that issue routine monthly or quarterly bills can be qualified as RVs and a subscriber can include any of these entities in the subscriber's profile so that when a billing notice is transmitted to the PSP's server, the subscriber receives notification of a communication falling within the his profile, accesses the information and proceeds with the required payment. Advantageously, the entire transaction can be completed via the PSN by including authorization for a funds transfer from one or more of a subscriber's financial services provider that is also a RV.

In a further preferred embodiment, the subscriber's PAD is configured to function as a server, or virtual server for Internet communications. In each of the following examples it will be understood that the RV provides a receiver for the PAD signal at the geographical location where a ticket or cash transaction would be required as a prerequisite to the subscriber's receiving the service or permitting the subscriber to pass through the collection. In these scenarios, the subscriber will have completed an earlier transaction, either in person at a place of business maintained by the RV or via the Internet. In the earlier transaction, the data issued by the RV, usually in exchange for financial consideration, was transmitted to the subscriber's PAD and stored there for later transmission to the receiving device at the point of service. The subscriber may store the data in any manner for retrieval that he chooses or the specialized device maintained by the RV can transmit a signal that is received and interpreted by the PAD to transmit the required encrypted signal in response. For example, tickets to a baseball game can be purchased in advance and the date, time and seat assignment transmitted, received and stored in the subscriber's PAD; the subscriber gains access to the stadium by bringing his PAD into proximity to the RV's device maintained at the stadium entry gate for this purpose. For facilitating the confirmation of proper seating, a ticket or other printed receipt can be issued at the point of entry identifying the seat previously assigned. Annual museum memberships can be established in a similar fashion by having the museum transmit appropriate data for entry on the subscriber/member's PAD indicating that dues have been paid establishing a certain class of membership for a prescribed term. Upon entry to the museum, the subscriber brings his PAD into proximity to the device maintained by the museum e.g. a turnstile, at which point the museum RV's device interrogates the PAD and receives a responsive transmission indicating status favorable to admission. A similar method and apparatus can be employed for gaining access to a monthly parking garage or even for making the necessary payment via the Internet for any one of many parking garages that are RVs. A similar system can be used for monthly or individual commuter service in which the monthly commutation information is maintained for transmission on the PAD, or the PAD is utilized to complete a cash transaction for an individual fare. In lieu of a printed ticket or other indicia, railroad conductors can be provided with a battery-powered device for communicating with rider's PADs as they pass the conductor on boarding the train or as the conductor passes through the railcar to check the seated passengers.

Similar transactions involving airlines or other mass transportation would benefit from this system.

In a preferred embodiment of the method, data transmitted by one or more registered vendors is processed and compared to the subscriber profile for each subscriber, any matches in subscriber profile account identifiers, or preferences, are noted, and only those subscribers for which such matches occur are notified of a registered vendor's data transmission.

In another preferred embodiment for the practice of the invention as in an example given above, the subscriber establishes communications via the Internet through the PSP for the purpose of purchasing goods and/or services from an RV, that RV applies to a financial services provider identified in the purchase transaction by the subscriber for an electronic funds transfer ("EFT"); the financial services provider (which must also be qualified as a registered vendor) communicates with the subscriber via its own PSP to obtain the subscriber's final authorization for the funds transfer transaction; the subscriber is notified of the request for authorization, and establishes communications with the financial services provider via its PSP and either confirms or refuses such authorization, thereby concluding or terminating the original transaction with the seller of the goods and/or services. In the above scenario, the financial services provider knows only that a request for a funds transfer to the account of the merchant has been received, but is not informed of the specific goods and/or services involved in the transaction. Similarly, the RV will learn the identity of the financial services provider that has effected the EFT, but will not have any account information about the subscriber.

The method and apparatus of the invention can also be utilized to establish anonymous cash accounts that can be used for bill paying, including automated bill paying to registered vendors. For example, in some jurisdictions, local highway, bridge and tunnel toll authorities have established an automated toll debiting system whereby a subscriber establishes a credit account with the governmental authority by depositing funds in exchange for which the subscriber is issued an electronic device which continuously transmits an encrypted signal that can be read by a bidirectional receiver as the vehicle passes through the toll plaza. The amount of the toll is deducted from the subscriber's account associated with the device. When funds in the account reach a prescribed minimum, the subscriber is either issued a bill in an arbitrarily predetermined amount or, in accordance with a preauthorization, an electronic funds transfer is effected from the subscriber's financial services provider. In either case, the subscriber's identity must be made known to the toll authority. Utilizing the method and system of the invention to maintain the privacy of the subscriber, the toll authority is provided with unique encrypted identifying indicia associated with a subscriber's cash account that can be accessed through the PSP with the subscriber's approval. The initial transaction can be completed via the Internet with a cash transfer to the toll authority, following which the subscriber takes delivery of the electronic toll device in person or by mail. At such time as the minimum balance is reached, the toll authority's computer generates a billing notice addressed to the subscriber's PSP, the subscriber is notified, accesses the billing notification addressed to the cash account and, if so desired, transmits the subscriber's approval for the EFT to the PSP, which in turn effects the EFT transaction to the toll authority's bank account.

In an alternative embodiment, the subscriber's PAD is utilized in conjunction with appropriately equipped receivers, e.g., for communication using Bluetooth RF, where the PAD itself is encoded with a toll-paying credit value. When the subscriber activates the PAD at the toll plaza, the balance of the credit on the PAD is reduced and no further toll device is necessary.

A similar method can be employed in those jurisdictions where subway or other regional transportation passes are issued by machines which operate much like automated teller machines (ATMs). In this example, the local transportation authority is established as an RV and the entire transaction can be effected by providing the transit card dispensing machine with a Bluetooth input/output device. To effect the transaction, the subscriber programs the PAD to indicate the source and, if necessary, the amount of the funds to be transferred to the transit authority from the subscriber's financial services provider or anonymous cash account, as described above. In the case of a transit card that is issued for a specified period of time, but with unlimited rides and no accounting of the accumulated fares or account balance, the transit authority's computer is programmed to notify the PSP of the impending termination date of the card's service, as well as the corresponding amount(s) that can be paid to continue service for specified periods of time. If the subscriber is wishes to extend the term of the fare card, an appropriate authorization is entered via the Internet; alternatively, if the card expires without any affirmative action having been taken by the subscriber, the transit authority billing notice is canceled.

From the above description and explanation, it will also be apparent that the PAD of the invention can be utilized to provide "access" to a variety of mechanical and/or electromechanical articles and products. For example, utilizing the transmission of encrypted low-range radio frequency signals, such as that provided with the Bluetooth technology, a receiver with appropriate circuitry can be incorporated into a wide variety of articles that will result in their being "unlocked" or activated when brought into sufficiently close proximity to receive the encoded signal from the subscriber's PAD. For example, an automobile or other vehicular ignition system can be modified to incorporate an electric switch which is closed only upon receipt of a signal transmitted from one or more particular PADs. As will be apparent, incorporation into such a system into an automobile can serve as an anti-theft device by supplementing even the key activated ignition system. This PAD-activated electronic switch can be incorporated into an essential computer-controlled automotive element so that even by hot-wiring or otherwise by-passing the manual key ignition, the engine cannot be started. The system could also be incorporated in commercial vehicles, public transportation, vehicles and the like so that only certain authorized users can operate the vehicles. The system can also be programmed so that if the PAD is moved from the predetermined proximity to the electronic ignition circuit, the vehicle will cease to function; alternatively, the disconnecting of the ignition system can be reverted to manual control of the ignition switch and withdrawal of the key. In a further preferred embodiment, the PAD can be programmed by the subscriber to require entry of a predetermined code to activate a particular device from among a plurality of devices, in which case, each device can also be activated by the same or a different transmitted signal.

In a similar manner, vending machines could also be accessed by the system.

Other examples for utilizing the PAD include gun safety in which the electromechanical receiving device is incorporated into the trigger safety release mechanism. The gun would include a standard device of any type currently in use; in addition, the electromechanical release that is responsive to an encoded signal received from a PAD brought into the proximity of the gun would not be overridden. In this system, the sensitivity to the received signal is adjusted so that the PAD must be in relatively close proximity to the gun, e.g. an arm's-length, three feet or some other predetermined or selectable distance, to provide reasonable assurance that the gun will be in the possession of the person who is carrying the PAD. In an especially preferred embodiment the receiver circuit would be powered by a battery connected to a switch activated by the conventional mechanical safety. Thus, when the safety is in the on position the battery switch is open and no power is being used in the receiver circuit; likewise, when the PAD is removed from activating proximity to the gun, the battery switch is opened to isolate it from the receiver circuit and can only be reactivated by movement of the mechanical safety the return of the PAD to within the prescribed proximity to the gun.

The PAD can be used for accessing conventional locks such as in a locker room, an office, or residential entry, a safe or lock box and the like. Depending upon the application, electrical power for the receiver circuit and related electromechanical device can be provided by appropriate wiring to an external power source or by a battery connected to the circuit. It the latter case, a signaling device to indicate battery condition and/or an alternative mechanical access means such as a keyed lock or combination can be provided in order to provide access in the event of a battery discharge.

Another example would be the transmission of digital signatures, which could be communicated under the control of the PAD using Bluetooth technology to send signatures to the other side.

Thus, the method of the invention comprehends the following:
1. establishing a web of servers as a PSN controlling all other aspects of the network;
2. providing one or more privacy service provider (PSP) servers, each having a PSPID;
3. distributing a uniquely encrypted PAD, each having a PSID, to each of a plurality of subscribers;
4. associating each PAD with a PSP, wherein the PSP acts as a gatekeeper for the PAD and stores the subscriber's private data and/or profile, utilizing the encryption embedded in that subscriber's PAD;
5. registering a plurality of vendors as registered vendors (RV) on the PSN, each RV having a PVID;
6. receiving messages on behalf of the PADs from registered vendors or other PADs;
7. notifying one or more subscribers of a data transmission from one or more registered vendors; and
8. providing access to a subscriber, in response to a subscriber's request, to a registered vendor's data stored on the server.

As used herein, the terms "communications" and "data transmissions" may be used interchangeably and will be understood to mean any type of digital data transmission including those that may originate or may be rendered audible in the form of voice, music, tones or beeps. Also included are digital data streams of text, financial information, graphical portrayals and the like.

While the present invention has been described with reference to the foregoing embodiments, changes and variations may be made therein which fall within the scope of the appended claims. All such modifications and/or changes are intended to be within the scope of the claims.

I claim:

1. A system for conducting a transaction with privacy on a wide area network, said system including a plurality of personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement comprising:

each PAD including memory for storing unique Privacy Subscriber Identification (PSID) data corresponding to a subscriber to said system, each manually portable PAD storing a subscriber profile including information related to the subscriber;

wherein the privacy provider is a privacy service provider (PSP) which stores at least a portion of the subscriber profile of each manually portable PAD, each manually portable PAD being accessible by said PSP based on first predetermined subscriber information that sets a first condition for proceeding with the transaction to perform either automatic authorization of the transaction without querying a subscriber with the PAD or manual authorization of the transaction by querying the subscriber to enter a command into the PAD as established by the subscriber in said subscriber's profile for controlling the processing of requests for authorization of the transaction, and said PSP being responsive in real-time to the interactive and wirelessly transmitted commands from said manually portable PAD;

wherein each vendor is registered with the privacy network as a registered vendor (RV) in order to conduct the transaction involving a subscriber; and wherein the privacy network is a privacy shield network (PSN) structured to carry communications relating to the transaction between said PSP and a specific RV based on second predetermined subscriber information that sets a second condition as specifically established by the subscriber in said subscriber's profile for controlling the completion of the transaction;

whereby the specific RV completes the transaction based on the communications with the PSN and without access to personal data of the subscriber, thereby preserving the privacy of the subscriber.

2. The system of claim 1, wherein said PAD stores private data associated with the subscriber, and wherein said PSP releases any of said private data to said RV only under said first and second conditions.

3. The system of claim 2, wherein said PSP includes memory for storing said profile and said private data.

4. The system of claim 1, wherein said PSP controls access by said RV to said PAD under said first and second conditions.

5. The system of claim 1, wherein said PSP includes a network server.

6. The system of claim 1, wherein said RV includes a network server.

7. The system of claim 1, wherein said PSN includes a network server.

8. The system of claim 1, wherein said PSP controls access by said RV to said profile under said second conditions.

9. The system of claim 1, further comprising a second registered vendor (RV) connected to the wide area network, said PSP being accessible by said second RV under third conditions set by said profile, said second RV being accessible by the first mentioned RV under fourth conditions set by said second RV and said first RV being accessible by said second RV under fifth conditions set by said first RV.

10. The system of claim 9, wherein said second conditions include authorization conditions for authorizing the transaction among said PAD, said first RV and said second RV.

11. The system of claim 10, wherein said authorization conditions include a first authorization for authorizing said second RV to complete an intermediate transaction with said first RV.

12. The system of claim 11, wherein said first authorization is sent from said PSP to said second RV over said PSN, said PSN preventing said first RV from access to said first authorization.

13. The system of claim 1, wherein said second conditions include authorization conditions for authorizing the transaction between said PAD and said RV.

14. The system of claim 13, wherein said authorization conditions control whether said first RV is authorized to request a response from said PAD.

15. The system of claim 1, wherein the wide area network is the Internet.

16. A personal access device (PAD) associated with a subscriber for conducting a transaction with privacy on a wide area network, said PAD operating in a system including a plurality of such personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement in the PAD comprising:

a memory for storing unique Privacy Subscriber Identification (PSID) data corresponding to the subscriber, and a profile of the subscriber;

a manually actuable command generator for generating the interactive commands;

a wireless transmitter for wirelessly transmitting the interactive commands to a privacy service provider (PSP) from the PAD, the PSP being the privacy provider and responsive in real-time to the wirelessly transmitted interactive commands, and with the PSP being connected to the wide area network, wherein the PSP stores at least a portion of the subscriber profile of each manually portable PAD; and a receiver for receiving authorized requests from the PSP, the PSP communicating with said PAD based on first predetermined subscriber information that sets a first condition for proceeding with the transaction to perform either automatic authorization of the transaction without querying a subscriber with the PAD or manual authorization of the transaction by querying the subscriber to enter a command into the PAD as established by the subscriber in said subscriber's profile for controlling requests for authorization of the transaction, each authorized request having been received by said PSP over a privacy shield network (PSN) as the privacy network connected to the wide area network from another PSP or from a vendor, wherein each vendor is registered with the PSN as a registered vendor (RV) with a specific RV communicating with the PSP based on second predetermined subscriber information that sets a second condition as specifically established by the subscriber in said subscriber's profile for controlling the completion of the transaction;

whereby the specific RV completes the transaction based on the communications with the PSN and without access to personal data of the subscriber, thereby preserving the privacy of the subscriber.

17. The PAD of claim 16, wherein the PSP receives first requests over the PSN and determines which ones of the first requests are authorized requests under said first conditions set by said profile.

18. The PAD of claim 17, wherein if the PSP determines that one of the first requests is not an authorized request, the PSP selectively responds to this first request over the PSN under second conditions set by said profile.

19. The PAD of claim 16, wherein said PAD is in the form of a selected one of a key chain fob, a pen, a cellular phone, a personal digital assistant, a computer and a card.

20. The PAD of claim 16, wherein said PAD stores private data associated with the subscriber, and wherein the PSP releases any of said private data to the RV only under said first and second conditions.

21. The PAD of claim 20, wherein the PSP includes memory for storing said profile and said private data.

22. A privacy provider operating in a system for conducting a transaction with privacy on a wide area network, said system including a plurality of personal access devices (PADs) each contained in a manually portable housing and capable of generating interactive commands transmitted wirelessly, with the privacy provider in communication with the PADs, a privacy network, and a plurality of vendors, with each of the privacy provider, the privacy network, and the plurality of vendors connected to a wide area network for communication with each other, the improvement in the privacy provider comprising:

a Privacy Service Provider (PSP) being the privacy provider and including:

a receiver for receiving the interactive commands transmitted wirelessly from the PAD;

a server, responsive in real-time to the wirelessly transmitted interactive commands from the manually portable PAD, with the PAD including memory for storing unique Privacy Subscriber Identification (PSID) data corresponding to a subscriber to said system, and with the manually portable PAD storing a subscriber profile including information related to the subscriber, with the server of the PSP including memory which stores at least a portion of the subscriber profile of each manually portable PAD, for communicating with the vendors, wherein each vendor is registered with the PSP as a registered vendor (RV) in order to conduct the transaction involving a subscriber over the privacy network operating as a PSN based on first predetermined subscriber information that sets a first condition for proceeding with the transaction to perform either automatic authorization of the transaction without querying a subscriber with the PAD or manual authorization of the transaction by querying the subscriber to enter a command into the PAD as established by the subscriber in said subscriber profile for controlling the completion of communications and in accordance with wirelessly transmitted interactive commands received from the PAD, said server also for receiving first requests from a specific RV and for determining which ones of the first requests are authorized requests based on second predetermined subscriber information that sets a second condition as specifically established by the subscriber in said subscriber profile for controlling the communications; and a transmitter for transmitting in real-time the authorized requests to the PAD;

whereby the specific RV completes the transaction based on the communications with the PSN and without access to personal data of the subscriber, thereby preserving the privacy of the subscriber.

23. The PSP of claim 22, wherein said server communicates with a plurality of RVs over the PSN in the same way as with the first-mentioned RV.

24. The PSP of claim 22, wherein the PAD stores private data associated with the subscriber, and wherein said PSP releases any of said private data to the RV only under said first and second conditions.

25. The PSP of claim 24, wherein the memory of the server of said PSP also stores said private data.

26. A privacy network operating in a system for conducting a transaction with privacy on a wide area network, said system including a plurality of personal access devices (PADs) each contained in a manually portable housing and capable of generating interactive commands transmitted wirelessly, with at least one privacy provider in communication with the PADs, and a plurality of vendors, with each of the privacy providers, the privacy network, and the plurality of vendors connected to a wide area network for communication with each other, the improvement in the privacy network comprising:

a Privacy Shield Network (PSN) being the privacy network and including:

a first server structure for controlling registration of vendors as registered vendors (RVs) in order to conduct the transaction involving a subscriber, with the PSN in communication with each of the privacy providers as Privacy Service Providers (PSP), where said PSN prevents transfer of communications from unregistered vendors to any of the PSPs and RVs; and a second server structure for controlling communications using the wide area network from any of the PSPs and RVs to any of the PSPs and RVs participating in the transaction, wherein said second server structure controls any communication in real-time between a first one of the PSPs and any other one of the PSPs and RVs based on first predetermined subscriber information that sets a first condition for proceeding with the transaction to perform either automatic authorization of the transaction without querying a subscriber with the PAD or manual authorization of the transaction by querying the subscriber to enter a command into the PAD for controlling the processing of communications as established by the subscriber in the subscriber's profile stored in memory of the PAD and controlled by the first PSP, with the real-time control of communications performed by the interactive commands transmitted wirelessly from the manually portable PAD accessible to each PSP;

wherein the memory of the PAD stores unique Privacy Subscriber Identification (PSID) data corresponding to the subscriber;

wherein the PSP stores at least a portion of the subscriber profile of each PAD;

whereby a specific RV completes the transaction based on the communications with the PSN and without access to personal data of the subscriber, thereby preserving the privacy of the subscriber.

27. The PSN of claim 26, wherein said second server structure controls routing of communications from any of the PSPs and RVs to any of the PSPs and RVs over the wide area network.

28. The PSN of claim 26, wherein each PAD stores private data associated with the respective subscriber, and wherein the associated PSP releases any of said private data to any of the PSPs and RVs only under said first and second conditions.

29. The PSN of claim 27, wherein at least one of the PSPs includes memory for storing said profile and said private data of the respective subscriber.

30. A method of conducting a transaction with privacy using a system including a plurality of personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement in said method comprising the steps of:

storing a profile of subscriber in memory of the PAD contained in a manually portable housing that is associated with the subscriber, wherein the privacy network is a Privacy Service Network;

storing in the memory of the PAD unique Privacy Subscriber Identification (PSID) data corresponding to the subscriber;

generating interactive commands using the PAD;

wirelessly transmitting the interactive commands from the PAD;

accessing the PAD in real-time based on first predetermined subscriber information that sets a first condition for proceeding with the transaction to perform either automatic authorization of the transaction without querying a subscriber with the respective PAD or manual authorization of the transaction by querying the subscriber to enter a command into the respective PAD as established by the subscriber in the subscriber profile for controlling the processing of requests for authorization of the transaction using a privacy service provider (PSP) as the privacy provider connected to the wide area network, the PSP being controlled by the wirelessly transmitted interactive commands from the PAD;

storing at least a portion of the subscriber profile of each PAD in a memory of the PSP;

providing a Privacy Shield Network (PSN) as the privacy network;

registering a vendor with the PSN as a registered vendor (RV) connected to the wide area network in order to conduct the transaction involving a subscriber; and transmitting communications between the PSP and a specific RV based on second predetermined subscriber information that sets a second condition as specifically established by the subscriber in the subscriber profile for controlling the completion of the transaction using the PSN;

whereby the specific RV completes the transaction based on the communications with the PSN and without access to personal data of the subscriber, thereby preserving the privacy of the subscriber.

31. A method of using a personal access device (PAD) associated with a subscriber for conducting a transaction with privacy on a wide area network in a system including a plurality of the personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement in said method comprising the steps of:

storing a profile of the subscriber in a memory contained in the manually portable housing of the PAD;

storing in the memory of the PAD unique Privacy Subscriber Identification (PSID) data corresponding to the subscriber;

generating interactive commands in the PAD;

wirelessly transmitting the interactive commands to a privacy service provider (PSP) as the privacy provider that is accessible to the PAD and connected to the wide area network;

storing at least a portion of the subscriber profile of each PAD in the PSP; and receiving authorized requests from the PSP, the PSP communicating in real-time with the PAD based on first predetermined subscriber information that sets a first condition for proceeding with the transaction to perform either automatic authorization of the transaction without querying a subscriber with the respective PAD or manual authorization of the transaction by querying the subscriber to enter a command into the respective PAD as established by the subscriber in the subscriber's profile for controlling the completion of the transaction, each authorized request having been received by the PSP under the control of a privacy shield network (PSN) as the privacy network connected to the wide area network, the vendors being registered with the PSN as registered vendors (RVs) in order to conduct the transaction involving a subscriber and communicating with the PSP based on second predetermined subscriber information that sets a second condition as specifically established by the subscriber in the subscriber's profile;

whereby a specific RV completes the transaction based on the communications with the PSN and without access to personal data of the subscriber, thereby preserving the privacy of the subscriber.

32. A method of using a system including a plurality of personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement in said method comprising the steps of:

storing a profile of the subscriber in a memory of the PAD;

storing in the memory of the PAD unique Privacy Subscriber Identification (PSID) data corresponding to the subscriber;

storing at least a portion of the subscriber profile of each PAD in a privacy service provider (PSP) as the privacy provider accessible to the PAD and connected to the wide area network;

using a first service structure for controlling registration of the vendors as registered vendors (RVs) in order to conduct the transaction involving a subscriber, where a Privacy Shield Network (PSN), as the privacy network, prevents transfer of communications of unregistered vendors to any of the PSPs and RVs; and using a second server structure for controlling communications using the wide area network from any of the PSPs and RVs to any of the PSPs and RVs, wherein the second server structure controls any communication in real-time between a first one of the PSPs and any other one of the PSPs and RVs under conditions set specifically by the subscriber's profile for proceeding with the transaction to perform either automatic authorization of the transaction without querying a subscriber with the respective PAD or manual authorization of the transaction by querying the subscriber to enter a command into the respective PAD, with the real-time control of communications performed by the interactive commands transmitted wirelessly from the manually portable PAD accessible to each PSP;

whereby a specific RV completes the transaction based on the communications with the PSN and without access to personal data of the subscriber, thereby preserving the privacy of the subscriber.

33. A system for a plurality of individual subscribers to receive and transmit communications via the Internet, the system including a plurality of personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement comprising:

an XML privacy service provider (PSP) as the privacy provider linked to the Internet for communication;

a plurality of private XML subscriber data files accessible to said PSP, each file being associated with a respective subscriber;

a memory in the PAD for storing unique Privacy Subscriber Identification (PSID) data corresponding to the subscriber and for storing a subscriber profile, with the PAD being a subscriber-programmable personal access device that provides subscriber access to the respective subscriber's data file and profile and communicates in real-time with said PSP using interactive commands transmitted wirelessly from the PAD; and a plurality of registered vendors (RVs) as the vendors, each vendor being registered with a Privacy Shield Network (PSN) as the privacy network in order to conduct the transaction involving the subscriber, with the RVs linked to the Internet for communication with the subscribers under conditions set by the respective subscriber's data files through said PSP for proceeding with the transaction to perform either automatic authorization of the transaction without querying a subscriber with the respective PAD or manual authorization of the transaction by querying the subscriber to enter a command into the respective PAD;

whereby a specific RV completes the transaction based on the communications with the PSN and without access to personal data of the subscriber, thereby preserving the privacy of the subscriber.

34. The system of claim 33, wherein said PSP comprises:
means for receiving communications from a subscriber;
means for transmitting a subscriber's file to that subscriber and for changing data in the subscriber's file in response to the subscriber's authorization; and
means for communicating with an RV in connection with a subscriber's file.

35. The system of claim 33, wherein each XML subscriber data file includes at least one of the following:
subscriber identifying data;
subscriber credit account data;
subscriber cash account data;
subscriber product preference identifiers; and
subscriber product exclusion identifiers.

36. The system of claim 33, wherein each PAD comprises:
a CPU, an operating system and a memory device for storing the profile;
a battery;
a wireless RF communication chip;
an input/output interface; and
an encryption key embedded in removable ROM.

37. A portable battery-powered personal access device (PAD) for use by a subscriber in a system for a plurality of individual subscribers that enables the subscriber to receive and transmit private personalized communications via the Internet, the system including a plurality of the personal access devices (PADs) each contained in a manually portable housing and capable of generating interactive commands transmitted wirelessly, a privacy provider for communication with the PADs, a privacy network, and a plurality of vendors, with each of the privacy provider, the privacy network, and the plurality of vendors connected to a wide area network for communication with each other, the improvement comprising:

an XML privacy service provider (PSP) as the privacy provider linked to the Internet for communication, a plurality of private XML subscriber data files accessible to the PSP, each file being associated with an individual subscriber, said PAD providing a subscriber access to that subscriber's file and a communications link with the PSP, and a plurality of registered vendors (RVs) linked to the Internet for communication with the subscribers under conditions set by each of the respective subscriber's files through the PSP, wherein said PAD includes:
at least one programmable integrated circuit (IC) device that includes encrypted identification means;

non-directional, short-range communication signal generation and receiving means for wirelessly transmitting interactive commands to the PSP in real-time;

a CPU, an operating system and a memory device for storing unique Privacy Subscriber Identification (PSID) data corresponding to the subscriber and for storing a subscriber profile utilized for proceeding with the transaction to perform either automatic authorization of the transaction without querying a subscriber with the respective PAD or manual authorization of the transaction by querying the subscriber to enter a command into the respective PAD; and an input/output interface;

whereby a specific RV completes the transaction based on the communications with the PSN and without access to personal data of the subscriber, thereby preserving the privacy of the subscriber.

38. The PAD of claim 37, wherein said IC device is removable from said PAD.

39. The PAD of claim 37, wherein the encrypted identification means is a unique digital code embedded in ROM.

40. The PAD of claim 39, wherein said IC device is pre-programmed to disable the identification means in the event that security of the unique digital code is breached.

41. The PAD of claim 37, wherein an electronic display is visible through an aperture in said housing and the PAD includes at least one manual actuator for controlling functions of said PAD.

42. The PAD of claim 41, further comprising a microphone having an on/off switch and a voice recognition program that converts voice to digital data for storage in said memory device.

\* \* \* \* \*